US 8,694,515 B2

(12) United States Patent
Takata et al.

(10) Patent No.: US 8,694,515 B2
(45) Date of Patent: Apr. 8, 2014

(54) IMAGE SEARCH DEVICE AND IMAGE SEARCH METHOD

(75) Inventors: Kazutoyo Takata, Osaka (JP); Kenji Mizutani, Kyoto (JP)

(73) Assignee: Panasonic Corporation, Osaka (JP)

(*) Notice: Subject to any disclaimer, the term of this patent is extended or adjusted under 35 U.S.C. 154(b) by 391 days.

(21) Appl. No.: 12/935,296

(22) PCT Filed: Nov. 5, 2009

(86) PCT No.: PCT/JP2009/005866
§ 371 (c)(1),
(2), (4) Date: Sep. 29, 2010

(87) PCT Pub. No.: WO2010/070804
PCT Pub. Date: Jun. 24, 2010

(65) Prior Publication Data
US 2011/0022634 A1 Jan. 27, 2011

(30) Foreign Application Priority Data
Dec. 19, 2008 (JP) .................................. 2008-324700

(51) Int. Cl.
*G06F 17/30* (2006.01)
(52) U.S. Cl.
USPC .......................................... 707/749; 707/776
(58) Field of Classification Search
USPC ................................................ 707/749, 776
See application file for complete search history.

(56) References Cited
U.S. PATENT DOCUMENTS

2002/0021298 A1* 2/2002 Fukuda ......................... 345/427
2002/0047798 A1* 4/2002 Platt ......................... 342/357.12
2003/0069893 A1 4/2003 Kanai et al.

(Continued)

FOREIGN PATENT DOCUMENTS

| CN | 101253537 | 8/2008 |
| JP | 2001-282813 | 10/2001 |

(Continued)

OTHER PUBLICATIONS de Silva, Gamhewage C., and Kiyoharu Aizawa. "Retrieving multimedia travel stories using location data and spatial queries." Proceedings of the 17th ACM international conference on Multimedia. ACM, 2009.*

(Continued)

*Primary Examiner* — Usmaan Saeed
*Assistant Examiner* — Nan Hutton
(74) *Attorney, Agent, or Firm* — Wenderoth, Lind & Ponack, L.L.P.

(57) ABSTRACT

Provided is an image search device which relatively easily searches a large amount of stored images for images that a user wishes to use for interpolation, and which includes: an interpolation range computing unit (103) which computes, as an interpolation range, a range of an area including a first photographing location where a first interpolation target image was taken and a second photographing location where a second interpolation target image was taken; an interpolation image candidate obtaining unit (104) which obtains, as candidate images, images whose photographing location are included in the interpolation range from the plurality of images; and an interpolation image selecting unit (106) which selects, from the candidate images, an image having a greater subject distance, which is a distance between a subject and an imaging device when the image was taken, as a traveling speed between the first photographing location and the second photographing location increases.

20 Claims, 19 Drawing Sheets

(56) References Cited

U.S. PATENT DOCUMENTS

| | | |
|---|---|---|
| 2004/0100506 A1* | 5/2004 | Shiota et al. .............. 345/838 |
| 2005/0182649 A1 | 8/2005 | Parulski |
| 2006/0080286 A1 | 4/2006 | Svendsen |
| 2007/0101247 A1 | 5/2007 | Matsuki et al. |
| 2007/0120986 A1* | 5/2007 | Nunomaki .............. 348/222.1 |
| 2008/0089592 A1 | 4/2008 | Isomura |

FOREIGN PATENT DOCUMENTS

| | | |
|---|---|---|
| JP | 2002-278993 | 9/2002 |
| JP | 2003-099434 | 4/2003 |
| JP | 2004-139576 | 5/2004 |
| JP | 2004-220420 | 8/2004 |
| JP | 2005-128785 | 5/2005 |
| JP | 2006-185242 | 7/2006 |
| JP | 2007-213216 | 8/2007 |
| JP | 2007-323315 | 12/2007 |
| WO | 2006/121192 | 11/2006 |

OTHER PUBLICATIONS

Boll, Susanne, et al. "Semantics, content, and structure of many for the creation of personal photo albums." Proceedings of the 15th international conference on Multimedia. ACM, 2007.*

International Search Report issued Dec. 1, 2009 in corresponding PCT Application No. PCT/JP2009/005866.

H. Homma et al., "A Construction Method of a Metadata Space for an Associative Search Utilizing the Relation of Each Word in Documents," 16th Data Engineering Workshop (DEWS2005), 6A-o2, the Institute of Electronics. Information and Communication Engineers. 2005, with partial English translation.

* cited by examiner

FIG. 3

| User ID | Image ID | Image address | Photographing time | Photographing location | Tag |
|---|---|---|---|---|---|
| User001 | u1_1 | ...u1_1.jpg | May 20, 2006 | (34.3,132.3) | Hiroshima, Itsukushima shrine |
| | u1_2 | ...u1_2.jpg | March 10, 2008 | (35.1,135.8) | Kyoto, Kiyomizu temple, Garden |
| | u1_3 | ...u1_3.jpg | March 10, 2008 | (35.0,135.8) | Kyoto, Kiyomizu temple, Nio gate |
| | u1_4 | ...u1_4.jpg | March 10, 2008 | (35.0,135.8) | Kyoto, Kiyomizu temple, Stage |
| User002 | u2_1 | ...u2_1.jpg | August 26, 2004 | (35.0,135.8) | Kyoto, Kiyomizu temple, Dumpling |
| ... | ... | ... | ... | ... | ... |

FIG. 12

| | Kyoto | Kiyomizu temple | Stage | Ginkaku temple | Garden | ... |
|---|---|---|---|---|---|---|
| Kyoto | - | 0.7 | 0.9 | 0.7 | 0.4 | ... |
| Kiyomizu temple | - | - | - | 0.3 | 0.1 | ... |
| Stage | - | - | - | 0.1 | 0.2 | ... |
| Ginkaku temple | - | - | - | - | 0.8 | ... |
| Garden | - | - | - | - | - | ... |
| ... | ... | ... | ... | ... | ... | ... |

FIG. 18

| Traveling speed (km/h) | Threshold of subject distance (m) |
|---|---|
| 5 | 0 |
| 10 | 3 |
| 15 | 5 |
| 20 | 10 |
| 30 | 30 |
| 50 | 100 |

IMAGE SEARCH DEVICE AND IMAGE SEARCH METHOD

TECHNICAL FIELD

The present invention relates to an image search device which searches a large volume of stored image content data for image content data to be used for interpolation between photographing locations of image content data taken by a user, and to an image search method.

BACKGROUND ART

When travelling, the user is sometimes busy taking photographs and cannot enjoy the travelling itself. Meanwhile, when visiting tourist sites, many travelers tend to photograph similar landscapes of similar places. In fact, in photo sharing services provided on the Internet, photos with similar composition as the photos taken by the user are often found. Thus, if photo albums that are memories of travel can be created easily by interpolating photos found in the photo sharing services with respect to the photos taken by the user, the user can record the memories of travel without photographing everything while traveling.

When the user creates a travel photo album using the photo sharing service, the user needs to enter keywords in order to search for photos used for interpolation. A characteristic of image content data is that unlike moving image content data or music content data, there is such an enormous amount of content data that viewing the list all at once is impossible. For example, in some of the representative photo sharing services, if the user enters only the keyword "Okinawa" for searching, more than one hundred thousand photos are found as search results. In order to select only the photos that the user wants to record as memories from among such a large number of photos, the user must narrow down the number of photos till the user can view their list on a monitor or the like. More specifically, the user needs to enter several keywords combined to narrow down the number of photos. Performing such entering, selecting and the like for each travel experience imposes significant operation burdens on the user.

For such a problem, there is a proposed method which allows the user to easily create the travel photo album using photos of tourist sites that are stored in a server in advance (For example, see Patent Reference 1). In the method disclosed in Patent Reference 1, using tag readers provided at respective photo spots at tourist sites, the user reads out high-quality photos of the spots that are pre-stored in the server. As a result, the user can easily create the travel photo album without taking photos of everything by himself or herself.

CITATION LIST

Patent Literature

[PTL 1]
Japanese Unexamined Patent Application Publication No. 2007-213216

SUMMARY OF INVENTION

Technical Problem

However, when the user travels by means other than walking, the user cannot stop at the photo spots to obtain photos to be used for interpolation. Thus, the technique disclosed in Patent Reference 1 has a problem that the user cannot add, to the photo album, photos having the imaging content that the user wishes to record in the album from among the photos of the landscapes viewed by the user while travelling.

For example, the conventional technique does not allow the user to obtain the photos of the landscape viewed by the user through the window while travelling on a train. Further, when the user travels by a car or a bicycle, the user needs to get off the bicycle or get out of the car to stop at the photo spots. Therefore, the conventional technique imposes significant burden on the user for obtaining the photos.

The present invention has been conceived to solve the problems, and provides an image search device and an image search method which allow the user to relatively easily search for an image that the user wishes to use for interpolation between the photographing locations of the image content data selected by the user without requiring the user to stop at the photo spots.

Solution to Problem

In order to solve the problem, an image search device according to an aspect of the present invention is an image search device which searches a plurality of images for an interpolation image to be used for interpolation between locations at which at least two interpolation target images were taken. The image search device includes: an interpolation range computing unit which computes, as an interpolation range, a range of a geographical area including a first photographing location and a second photographing location, the first photographing location being a location at which a first interpolation target image was taken, and the second photographing location being a location at which a second interpolation target image was taken; an interpolation image candidate obtaining unit which obtains, as a candidate image, an image whose photographing location belongs to the interpolation range computed by said interpolation range computing unit, from among the plurality of images stored in an image database; and an interpolation image selecting unit which selects, as the interpolation image from among the candidate image, an image having a subject distance which increases as a traveling speed between the first photographing location and the second photographing location increases, the subject distance being a distance between a subject and an imaging device when the image was taken.

With this, it is possible for the user to relatively easily search a large number of images for the images to be used for interpolation between the photographing locations of the images selected by the user without requiring the user to stop at the photo spots. Further, it is possible to obtain only the necessary images according to the travelling speed of the user, which allows the searching for the interpolation images suitable for the user. For example, when the interpolation images searched for by the image search device are output, the user can relatively easily interpolate the images of the events that the user experienced between the two images taken by the user, using the images taken by other people.

Further, when the interpolation images searched for by the image search device are output, the user can obtain interpolation images without using dedicated infrastructure such as tag readers.

Advantageous Effects of Invention

According to the present invention, it is possible to relatively easily search a large volume of stored image content data for the images to be used for interpolation between the photographing locations of the image content data photographed by the user, without requiring the user to stop at the photo spots.

BRIEF DESCRIPTION OF DRAWINGS

FIG. 1 is a block diagram showing a characteristic functional structure of an image search device according to Embodiment 1 of the present invention.

FIG. 2 is a diagram showing an example of image content data and content associated information.

[FIG. 3]

FIG. 3 is a diagram showing an example of an image database.

FIG. 4 is a diagram showing an example of a screen of an input unit.

FIG. 5 is a diagram showing an example of an interpolation range.

FIG. 6 is a flowchart showing flow of overall processing performed by the image search device according to Embodiment 1 of the present invention.

FIG. 7 is a flowchart showing flow of detailed processing of Step S105 of FIG. 6.

[FIG. 7]

FIG. 9 is a diagram showing an example of a screen provided to an output medium by an output unit.

FIG. 10 is a diagram showing another example of the screen provided to the output medium by the output unit.

FIG. 11 is a block diagram showing a characteristic functional structure of an image search device according to Embodiment 2 of the present invention.

[FIG. 12]

FIG. 12 is a diagram showing an example of a degree-of-association database.

FIG. 13 is a conceptual diagram showing hierarchically grouped areas.

FIG. 14 is a flowchart showing flow of overall processing performed by the image search device according to Embodiment 2 of the present invention.

FIG. 15 is a flowchart showing flow of detailed processing of Step S301 of FIG. 14.

FIG. 16 is a diagram showing an example of a degree-of-association database.

FIG. 17 is a flowchart showing flow of other detailed processing of Step S301 of FIG. 14.

[FIG. 18]

FIG. 18 is a diagram showing an example of a subject distance database.

FIG. 19 is a diagram showing an example of a computer hardware configuration.

DESCRIPTION OF EMBODIMENTS

Hereinafter, an image search device according to an aspect of the present invention will be described in detail with reference to the drawings. It is to be noted that for simplicity of explanation, the following embodiments use an example case where a travel photo album is created by interpolating images stored in a database with respect to the images photographed by a user during the user's trip to Kyoto.

[Embodiment 1]

Figure 1:
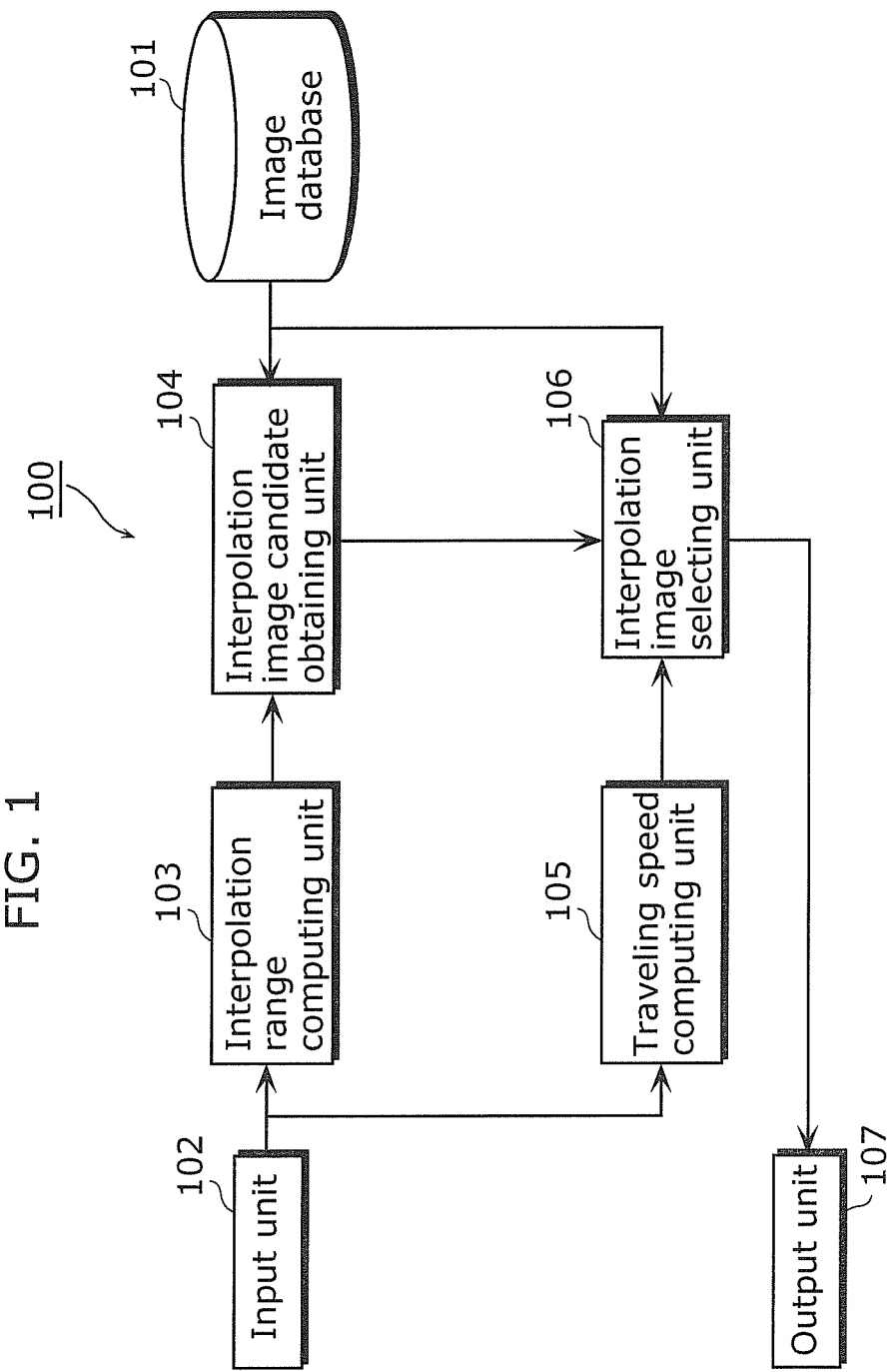
[FIG. 1]

FIG. 1 is a block diagram showing a characteristic functional structure of the image search device 100 according to Embodiment 1 of the present invention. As shown in FIG. 1, the image search device 100 is a device which searches a plurality of images for interpolation images. Here, the interpolation image refers to an image used for interpolation between the photographing locations of two images. More specifically, the interpolation image refers to an image photographed at the location between the photographing locations of the two images. The image search device 100 includes: an image database 101; an input unit 102: an interpolation range computing unit 103; an interpolation image candidate obtaining unit 104; a travelling speed computing unit 105; an interpolation image selecting unit 106; and an output unit 107.

Hereinafter, details of each element of the image search device 100 shown in FIG. 1 are described in order.

The image database 101 is a storage device which includes, for example, hard disk or memory. The image database 101 is a database which stores image content data 20 that are targets for search and content associated information 21 which correspond to the respective image content data 20. Here, the image content data 20 refers to an image stored in an electronic medium. Further, the content associated information 21 is information indicating the details of the image content data 20. To be more specific, the content associated information 21 is, for example, Exchangeable image file format (Exif) information (such as photographing time and date, latitude and longitude information) that is added to the image content data 20 when the photo is taken, and image information such as a tag that is added by the user to the image content data 20 after the photo was taken.

Figure 2:
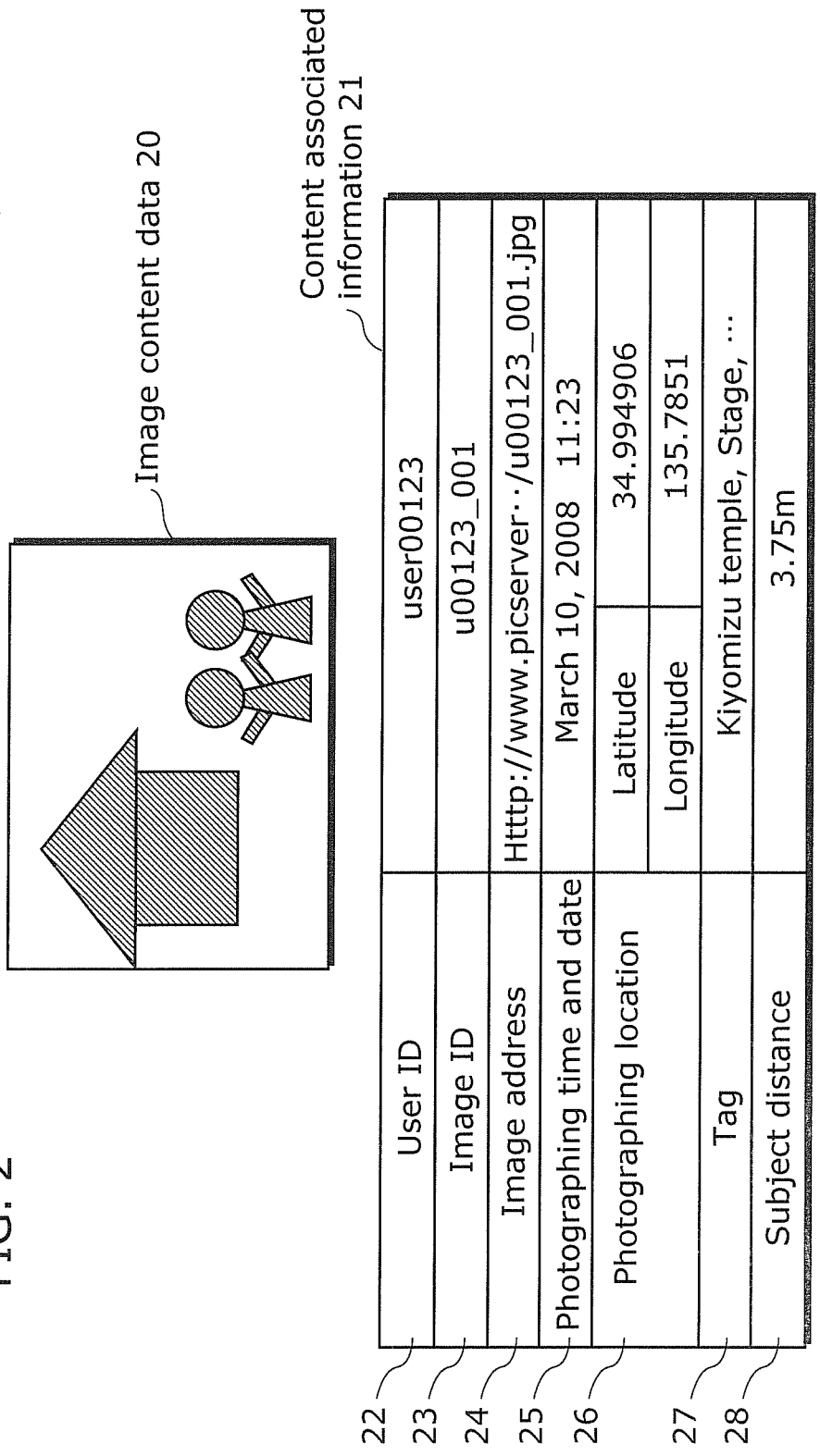
[FIG. 2]

FIG. 2 is a diagram showing an example of the image content data 20 and the content associated information 21 stored in the image database 101. As shown in FIG. 2, the image database 101 stores, in addition to the image content data 20, the content associated information 21 including a user ID 22, an image ID 23, an image address 24, a photographing time and date 25, a photographing location 26, a tag 27, and a subject distance 28.

The user ID 22 indicates information for identifying the user who took the photograph of the image content data 20. The image ID 23 indicates information for identifying the image content data 20. The image address 24 indicates where the image content data 20 is stored. The photographing time and date 25 indicates the time and date when the image content data 20 was taken. The photographing location 26 indicates the location where the image content data 20 was taken. The location where the image content data 20 was taken is specified by latitude and longitude.

The subject distance 28 indicates the distance from the camera to the subject when the image content data 20 was taken. The subject distance 28 is automatically assigned to the image as Exif information when the image is taken. Note that in the case where the subject distance 28 is not automatically assigned to the image, the subject distance a obtained using the following equation may be included in the content associated information 21.

[Equation 1]

$$a = f\left(1 + \frac{1}{M}\right) \quad (1)$$

Here, a denotes subject distance, f denotes focal length, and M denotes photographing magnification. More specifically, the image database 101 may store the subject distance a obtained by substituting, into the equation (1), the photographing magnification and focal length included in the Exif information assigned to each image content data, for the image content data to which no subject distance is assigned as Exif information out of the image content data stored in the image database 101.

The tag 27 indicates words (keywords) representing the content of the image content data 20. For example, the user manually inputs those words to the tag 27 after the image was taken. Further, the image search device 100 may automatically add, as the tag 27, the name of the area or building obtained based on information of latitude and longitude included in the photographing location 26. The image search device 100 may also automatically add, as the tag 27, information of weather and temperature using the photographing time and date 25, the photographing location 26, and weather database. Further, the image search device 100 may also automatically add, as the tag 27, the representative color of the image obtained from pixel values of the image content data 20. Further, the image search device 100 may automatically add, as the tag 27, information of the number of people detected by human detection performed on the image content data 20.

FIG. 3 is a diagram showing an example of the image database 101. As shown in FIG. 3, the image database 101 includes lists of content associated information shown in FIG. 2 for facilitating search.

It is to be noted that in the present embodiment, a case where the image database 101 is included in the image search device 100, but the image search device to which the present invention is applied is not limited to such an image search device. For example, the image database 101 may be provided on a server connected to the image search device via a network.

Further, the content associated information 21 may be included in the image content data 20.

Further, the image database 101 may store the traveling speed of the user between the images as the content associated information 21. The traveling speed is a value obtained by dividing the distance between the photographing locations of two interpolation target images by the time difference between the photographing time of the two interpolation target images. For example, the traveling speed of the image content data 20 can be obtained by dividing the distance between the photographing locations of the image content data 20 and image content data taken next by the time difference of the photographing time. The obtained traveling speed is stored as the content associated information 21. As described, the traveling speed between the images may be stored in the image database 101. Further, as described later, the traveling speed computing unit 105 may compute the traveling speed upon each receipt of an input from the user.

Now, descriptions of each element of the image search device 100 shown in FIG. 1 is continued.

The input unit 102 obtains information input by the user via, for example, a keyboard or a mouse, to a memory or the like. More specifically, the input unit 102 obtains the image content data 20 photographed by the user and their image IDs 23 as well as interpolation target images, among the image content data 20, of which the user wishes to interpolate between the photographing locations, and information on those interpolation target images (e.g., image IDs 23). Then, the input unit 102 notifies the interpolation range computing unit 103 and the traveling speed computing unit 105 of the obtained image IDs 23 of the interpolation target images.

Figure 4:
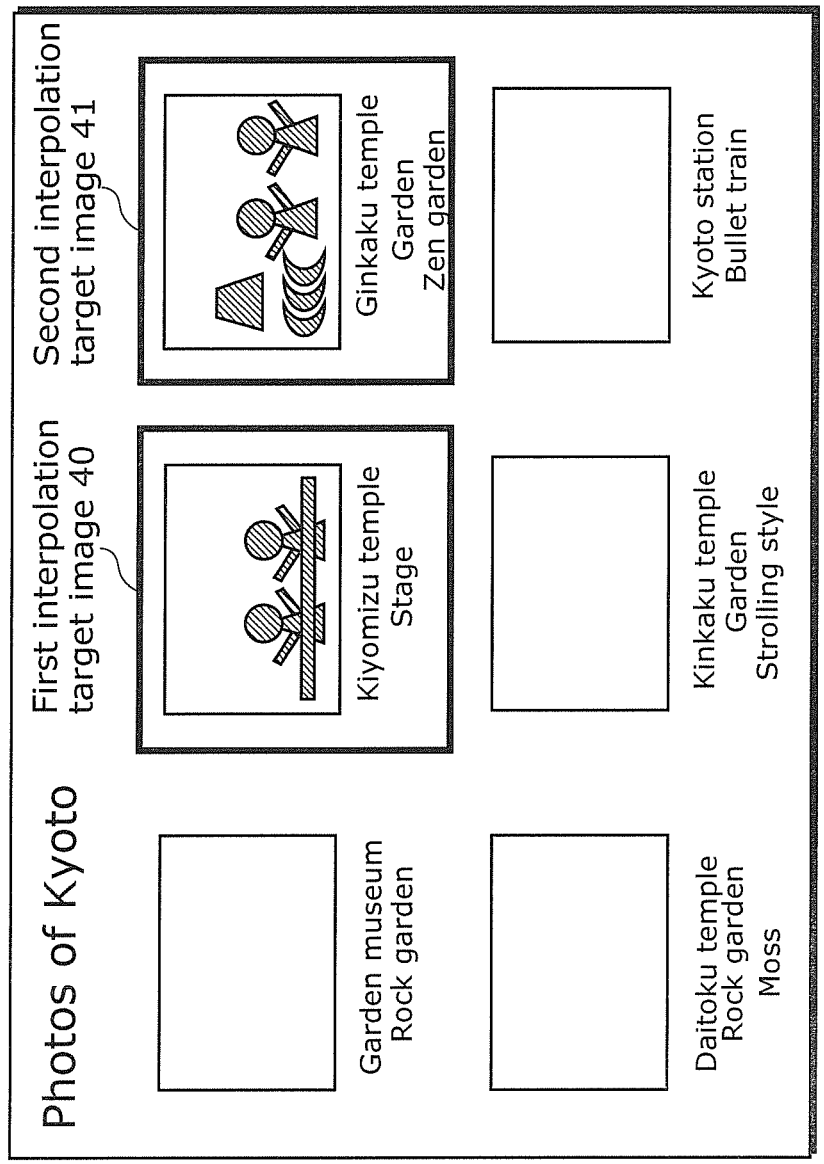
[FIG. 4]

FIG. 4 is a diagram showing an example of a screen of the input unit 102. As shown in FIG. 4, the user selects a plurality of image content data 20 (interpolation target images) of which the user wishes to interpolate between the photographing locations, from among the image content data 20 photographed by the user. In this example, the user selects a first interpolation target image (Kiyomizu temple) 40 and a second interpolation target image (Ginkaku temple) 41 from among six items of image content data 20 photographed in Kyoto. In other words, the input unit 102 receives, from the user, a request to interpolate images of places between Kiyomizu temple and Ginkaku temple.

It is to be noted that the interpolation target images do not always have to be selected directly by the user. For example, the image search device may infer the interpolation target images based on the user's preference or the like. Another example is that the user may input the places that the user visited so that the image search device selects interpolation target images based on the information of the input places.

The interpolation range computing unit 103 includes, for example, Central Processing Unit (CPU) or memory storing programs. The interpolation range computing unit 103 refers to the image database 101 to obtain the photographing locations 26 and the photographing time and date 25 of the image IDs 23 provided to the input unit 102. Then, the interpolation range computing unit 103 computes, using the obtained photographing locations 26 and photographing time and date 25, the interpolation range 52 indicating the range of the target area of interpolation. More specifically, the interpolation range computing unit 103 computes the range of the area including the photographing locations 26 of the interpolation target images, as the interpolation range. Subsequently, the interpolation range computing unit 103 computes the interpolation range such that the greater the elapsed time is between the photographing time and date 25 of the interpolation target images, the larger the range of the target area of interpolation is. Further, the interpolation range computing unit 103 notifies the interpolation image selecting unit 106 of the computed interpolation range 52. Specific method of computing of the interpolation range will be described later.

Figure 5:
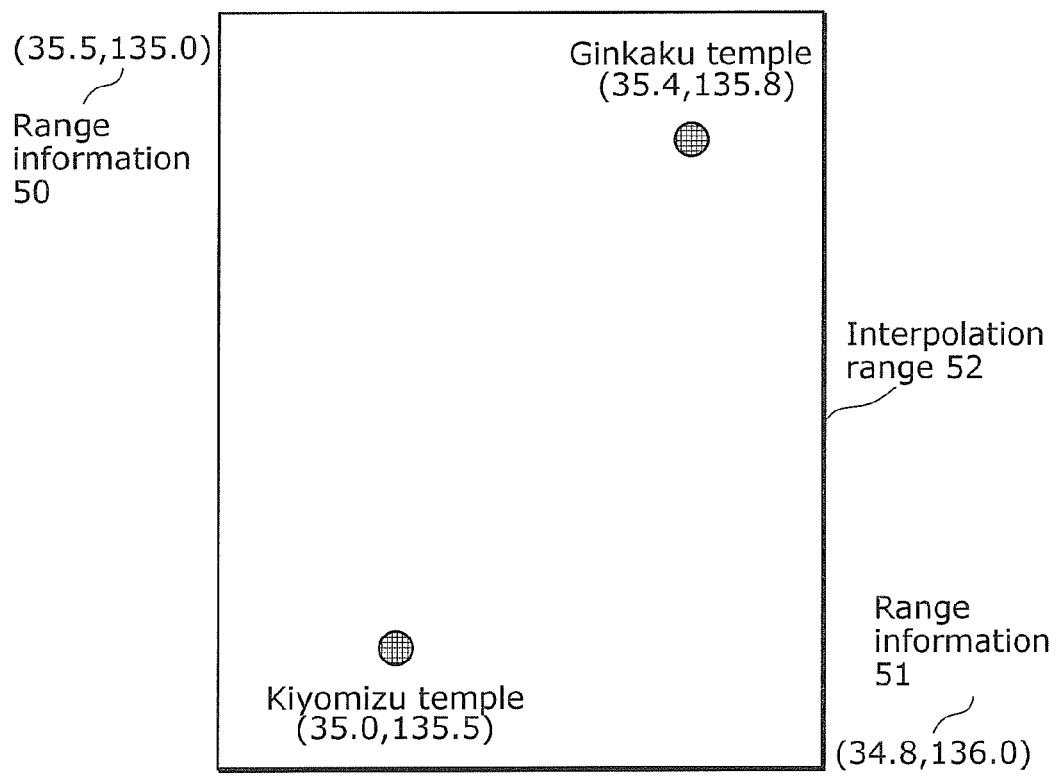
[FIG. 5]

FIG. 5 is a diagram showing an example of the interpolation range 52 computed based on the first interpolation target image (Kiyomizu temple) 40 and the second interpolation target image (Ginkaku temple) 41. As shown in FIG. 5, in the case where the interpolation range 52 is obtained in a rectangle, the interpolation range computing unit 103 computes the latitude and the longitude of diagonal points of the rectangle as range information 50 and range information 51.

The interpolation image candidate obtaining unit 104 includes, for example, CPU or memory storing programs.

The interpolation image candidate obtaining unit 104 detects a group of images photographed within the interpolation range computed by the interpolation range computing unit 103. More specifically, the interpolation image candidate obtaining unit 104 refers to the image database 101 to obtain the image IDs of the group of images included in the latitude and longitude information computed by the interpolation range computing unit 103. Then, the interpolation image candidate obtaining unit 104 notifies the interpolation image selecting unit 106 of the obtained image IDs.

The traveling speed computing unit 105 includes, for example, CPU or memory storing programs. The traveling speed computing unit 105 computes the traveling speed of the user between the interpolation target images obtained from the input unit 102. More specifically, the traveling speed computing unit 105 computes the linear distance between the photographing locations 26 of the interpolation target images. Further, the traveling speed computing unit 105 computes the time from the time difference between the photographing time and date 25 of the interpolation target images. The traveling speed computing unit 105 computes the traveling speed by dividing the computed distance by the computed time. Further, the traveling speed computing unit 105 notifies the interpolation image selecting unit 106 of the photographing location information of the interpolation target images and the computed traveling speed information. Here, the traveling speed is, in the case where the interpolation target images were photographed by the same user, speed at which the user traveled from the photographing location of one interpolation target image to the photographing location of the other interpolation target image. To be more specific, the traveling speed is a value obtained by dividing the distance between the photographing locations of two interpolation target images by the time difference between the photographing time of the two interpolation target images.

The interpolation image selecting unit 106 includes, for example, CPU or memory storing programs. The interpolation image selecting unit 106 selects, from among the group of images obtained from the interpolation image candidate obtaining unit 104, only necessary images according to the user's traveling speed, using the image IDs obtained from the interpolation image candidate obtaining unit 104, the photographing location information and the traveling speed information obtained from the traveling speed computing unit 105, and the image database 101. In other words, the interpolation image selecting unit 106 selects interpolation images from among the candidate images obtained by the interpolation image candidate obtaining unit 104 such that the higher the traveling speed computed by the traveling speed computing unit 105 is, only the images with greater subject distance are selected. To be more specific, the interpolation image selecting unit 106 selects all images in the image group obtained from the interpolation image candidate obtaining unit 104 when the traveling speed is equal to or less than a predetermined threshold. On the other hand, the interpolation image selecting unit 106 obtains, from among the image group obtained from the interpolation image candidate obtaining unit 104, only the photos with subject distance having a value equal to or greater than a predetermined threshold (long-distance view photo) when the traveling speed is greater than the predetermined threshold. The interpolation image selecting unit 106 notifies the output unit 107 of the image IDs of the selected images. It may be that the interpolation image selecting unit 106 obtains, from the image database 101, the user's traveling speed between the interpolation target images obtained from the input unit 102. Specific method of selection of the interpolation images will be described later.

The following describes why the interpolation image selecting unit 106 selects the images with a subject distance which increases as the traveling speed is higher. When the traveling speed of a photographer is relatively low (such as walking), the photographer can view both close-range subjects and long-range subjects. Thus, the images of both the short-distance view image that has a short subject distance and the long-distance view image that has a long subject distance match the experiences of the photographer, and both of the images can be interpolation images. On the other hand, when the traveling speed is relatively high (such as a bicycle or train), the photographer cannot view the close-range subject carefully. Therefore, when the traveling speed is high, the short-distance view image does not match the image that the user wishes to use for interpolation. Thus, the interpolation image selecting unit 106 selects images of both long-distance view and short-distance view when the traveling speed is low, and selects only the long-distance view images when the traveling speed is high. As a result, the image search device 100 can search for only the images which match the images that the user wishes to use for interpolation.

The output unit 107 outputs the image content data 20 obtained by the interpolation image selecting unit 106 to an output medium. Examples of the output medium include a monitor such as a liquid crystal display and TV.

Next, the operations of the image search device 100 configured as above will be described.

Figure 6:
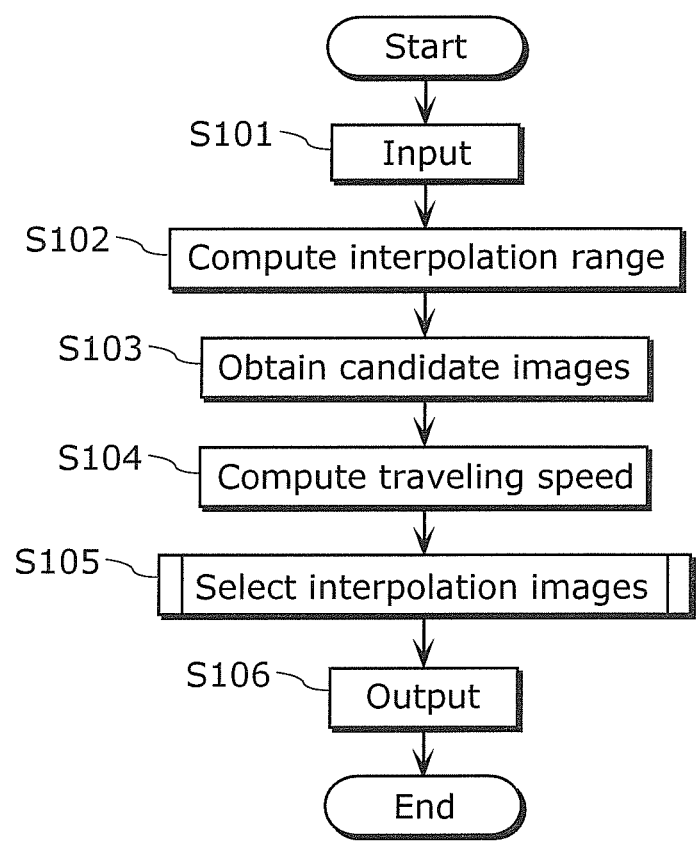
[FIG. 6]

FIG. 6 is a flowchart showing flow of overall processing performed by the image search device 100.

First, the input unit 102 receives the image IDs 23 of the image content data 20 taken by the user, and the image IDs 23 of the interpolation target images to which the user wishes to interpolate among the image IDs 23 of the image content data 20. Then, the input unit 102 notifies the interpolation range computing unit 103 and the interpolation image candidate obtaining unit 104 of the received image IDs 23 of the interpolation target images (Step S101).

Next, the interpolation range computing unit 103 obtains, from the image database 101, the photographing locations 26 and the photographing time and date 25 corresponding to the image IDs 23 of the interpolation target images notified from the input unit 102. Then, the interpolation range computing unit 103 computes, using the obtained photographing locations 26 and photographing time and date 25, the interpolation range indicating the range of target area of interpolation. Further, the interpolation range computing unit 103 notifies the interpolation image candidate obtaining unit 104 of the computed interpolation range (Step S102).

More particularly, for example, the interpolation range computing unit 103 computes, as the interpolation range, the range whose center is the centroid of the photographing locations 26 (latitude and longitude) of the interpolation target images and whose distance of radius is proportional to the elapsed time obtained by the photographing time and date 25 of the interpolation target images. Here, the elapsed time is the difference between the photographing time and date 25 of the interpolation target images. Note that when there are three or more interpolation target images, the elapsed time is determined to be the difference between the oldest photographing time and date 25 and the latest photographing time and date 25 among the photographing time and date 25 of the three or more interpolation target images.

Further, the interpolation range computing unit 103 may select, from among multiple predetermined ranges, a range including the photographing locations 26 (latitude and longitude) of the interpolation target images, as the interpolation range. In this case, the interpolation range computing unit 103 may add a range adjacent to the selected range to the interpolation range according to the elapsed time between the interpolation target images.

Further, when the elapsed time obtained from the photographing time and date 25 of the interpolation target images is equal to or greater than predetermined threshold, the interpolation range computing unit 103 may present the ranges as shown in FIG. 5 so that the user can designate the interpolation range. With this, the interpolation range computing unit 103 can prevent that the interpolation range becomes too large and that the interpolation range is incorrectly computed.

Next, the interpolation image candidate obtaining unit 104 detects the image group included in the interpolation range computed by the interpolation range computing unit 103, and notifies the interpolation image selecting unit 106 of the detected image group (Step S103). More specifically, the interpolation image candidate obtaining unit 104 refers to the image database 101 to obtain the image IDs of the image group included in the latitude and longitude information computed by the interpolation range computing unit 103.

Next, the traveling speed computing unit 105 computes the traveling speed of the user between each interpolation target image, using the photographing time and date 25 and the photographing location 26 of each interpolation target image obtained from the input unit 102, and notifies the interpolation image selecting unit 106 of the photographing location information of the interpolation target images and the computed speed information (Step S104).

More specifically, for example, the traveling speed computing unit 105 computes the distance x between the photographing locations based on the difference of the photographing locations between the first interpolation target image (Kiyomizu temple) 40 and the second interpolation target image (Ginkaku temple) 41. On the other hand, the traveling speed computing unit 105 computes the time t based on the difference between the photographing time. The traveling speed computing unit 105 computes the traveling speed by dividing the distance x by the time t.

It may be that the traveling speed computing unit 105 searches for a route between the photographing locations using a separately prepared map database, and computes the distance x along the searched route. Accordingly, the traveling speed computing unit 105 can accurately compute the distance between the photographing locations. Therefore, the traveling speed computing unit 105 can improve the accuracy of the computation of the traveling speed, and avoid presenting, to the user, unnecessary interpolation images due to the incorrectly computed traveling speed.

Next, the interpolation image selecting unit 106 selects, as interpolation images, candidate images which match the traveling speed, based on the photographing location information and the speed information of the interpolation target images notified by the traveling speed computing unit 105 (Step S105).

Lastly, the output unit 107 outputs, to the output medium, the interpolation images obtained by the interpolation image selecting unit 106 (Step S106).

Figure 7:
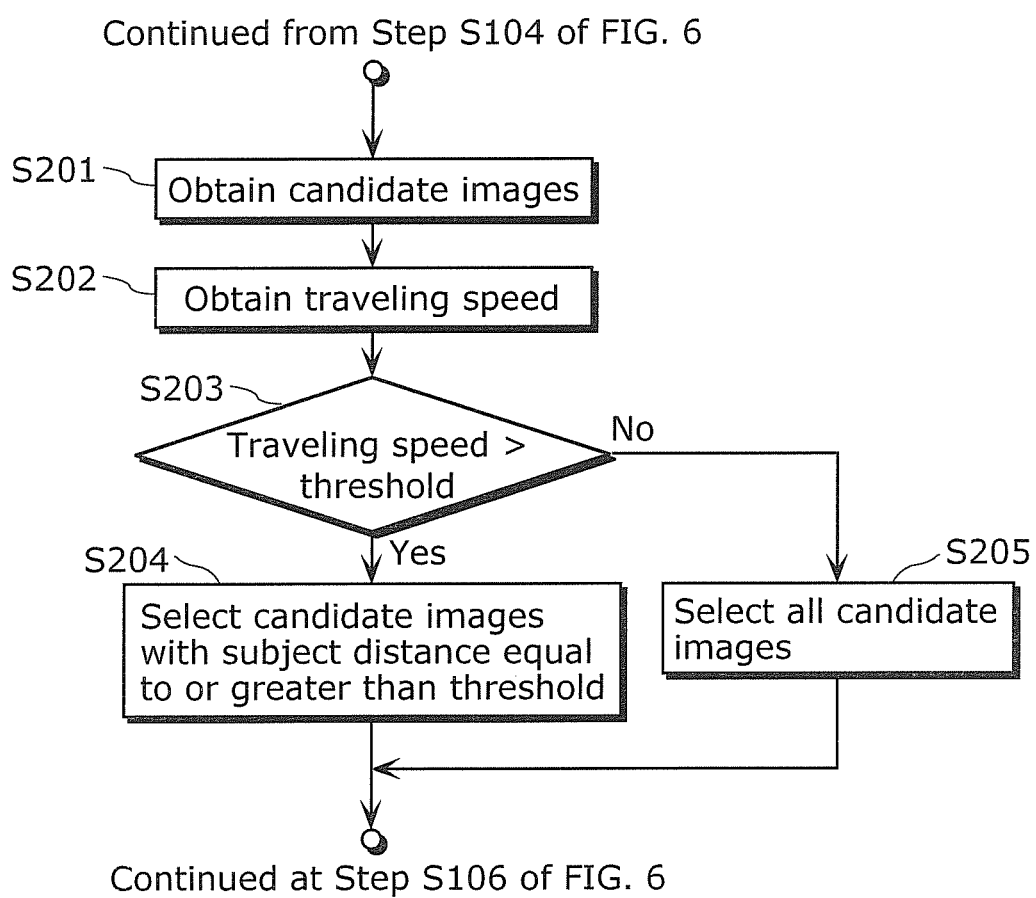
[FIG. 7]

FIG. 7 is a flowchart showing flow of detailed processing performed by the interpolation image selecting unit 106 for selecting the interpolation images (Step S105 of FIG. 6). Hereinafter, the method of selecting images which match the traveling speed will be described with reference to FIG. 7.

First, the interpolation image selecting unit 106 obtains the image IDs of the candidate images from the interpolation image candidate obtaining unit 104 (Step S201).

Next, the interpolation image selecting unit 106 obtains the user's traveling speed from the traveling speed computing unit 105 (Step S202).

Next, the interpolation image selecting unit 106 determines whether or not the traveling speed is greater than a predetermined threshold (Step S203). Here, when the traveling speed is greater than the threshold (Yes in Step S203), the processing continues at Step S204. On the other hand, when the traveling speed is equal to or less than the threshold (No in Step S203), the processing continues at Step S205. For the threshold of the traveling speed, for example, a maximum walking speed of the average person (approximately 12 km/hour) may be used. With this, the interpolation image selecting unit 106 can determine whether or not the user walked between the photographing locations of the interpolation target images.

Next, the interpolation image selecting unit 106 selects as the interpolation images, from among the candidate images obtained in Step S201, only the images with subject distance having a value equal to or greater than the threshold (Step S204). The threshold of the subject distance may be, for example, set to 10 m by a designer. As described, when the traveling speed is relatively high (such as a bicycle or train), the photographer cannot view the close-range subject carefully. Therefore, when the traveling speed is high, the short-distance view image does not match the images that the user wishes to use for interpolation. Accordingly, the interpolation image selecting unit 106 can select only the images which match the images that the user wishes to use for interpolation by selecting, as the interpolation images, only the long-distance view images when the traveling speed is high.

Next, the interpolation image selecting unit 106 selects, as the interpolation images, all the candidate images obtained in Step S201 (Step S205). When the traveling speed of the photographer is relatively low (such as walking), the photographer can view both the close-range subject and long-range subject. Therefore, the images of both the short-distance view and the long-distance view match the experience of the photographer, and both of the images can be interpolation images. As a result, when the traveling speed is low, the interpolation image selecting unit 106 can select the images which match the images that the user wishes to use for interpolation by selecting both of the images of long-distance view and short-distance view.

Figure 8:
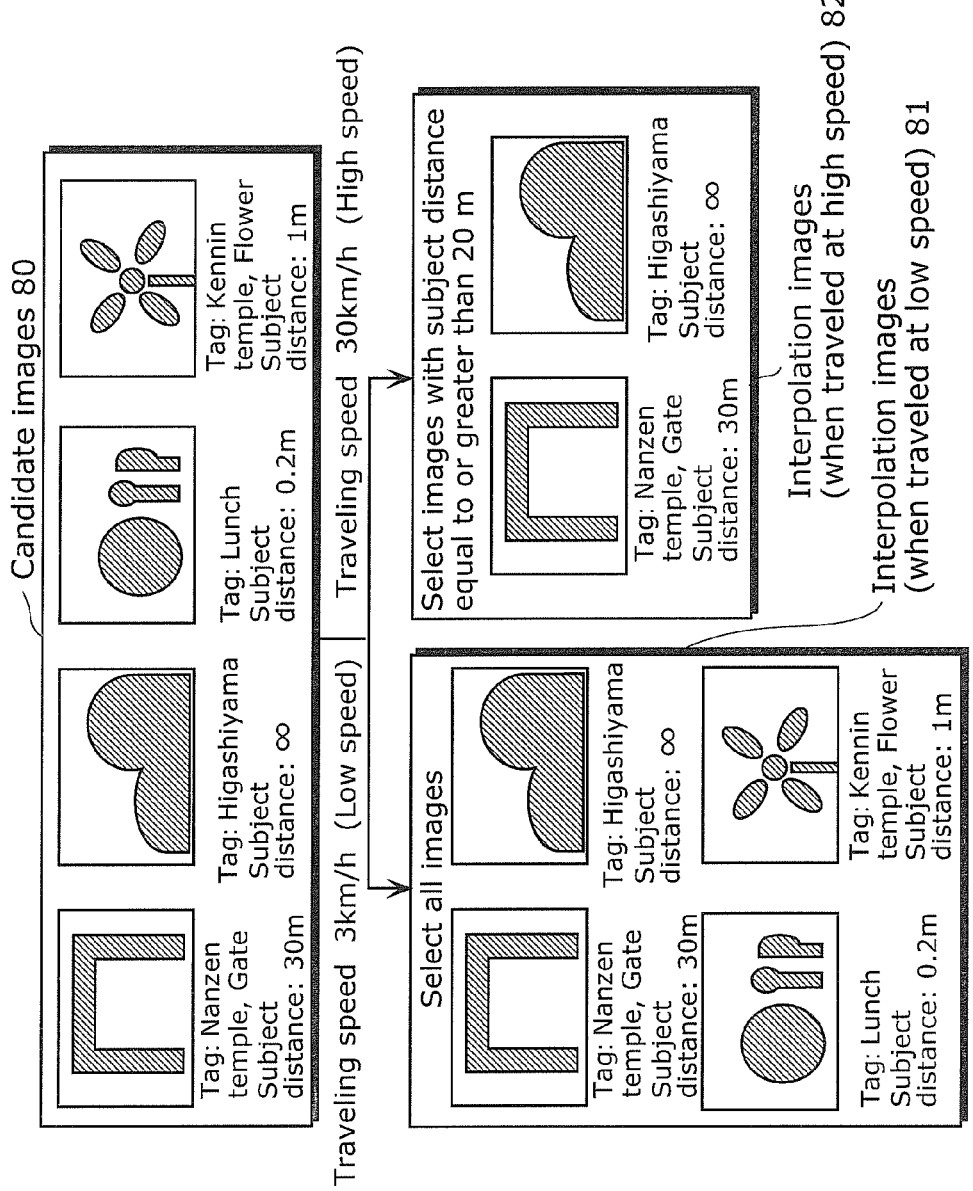
FIG. 8 is a diagram showing an example of processing result of the interpolation image selecting unit.

FIG. 8 is a diagram showing an example of a result of processing from Steps S201 to S205, performed by the interpolation image selecting unit 106, where different interpolation images are selected according to the traveling speed. As a precondition, it is assumed that the user has selected the first interpolation target image (Kiyomizu temple) 40, and the second interpolation target image (Ginkaku temple) 41 shown in FIG. 4, and that the interpolation range is the interpolation range 52 shown in FIG. 5. It is also assumed that the candidate images 80 are the images, among the images present in the image database 101, whose photographing locations are included in the interpolation range 52. Here, all the candidate images are selected for the interpolation images (when traveling at low speed) 81 when the user's traveling speed computed from the photographing time of the first interpolation target image (Kiyomizu temple) 40 and the second interpolation target image (Ginkaku temple) 41 is equal to or less than the threshold (12 km/h) is in Step S203. More specifically, when the traveling speed is "3 km/h", the interpolation image selecting unit 106 selects the interpolation images (when traveling at low speed) 81. On the other hand, when the traveling speed is equal to or greater than the threshold (12 km/h), only the images with the subject distance having a value greater than the threshold (20 m) are selected from among the candidate images, as the interpolation images (when traveling at high speed) 82. More specifically, when the traveling speed is "30 km/h", the interpolation image selecting unit 106 selects the interpolation images (when traveling at high speed) 82.

By performing the processing of Steps S201 to S205, the interpolation image selecting unit 106 can select, as the interpolation images, only the images which match the traveling speed of the user.

Figure 9:
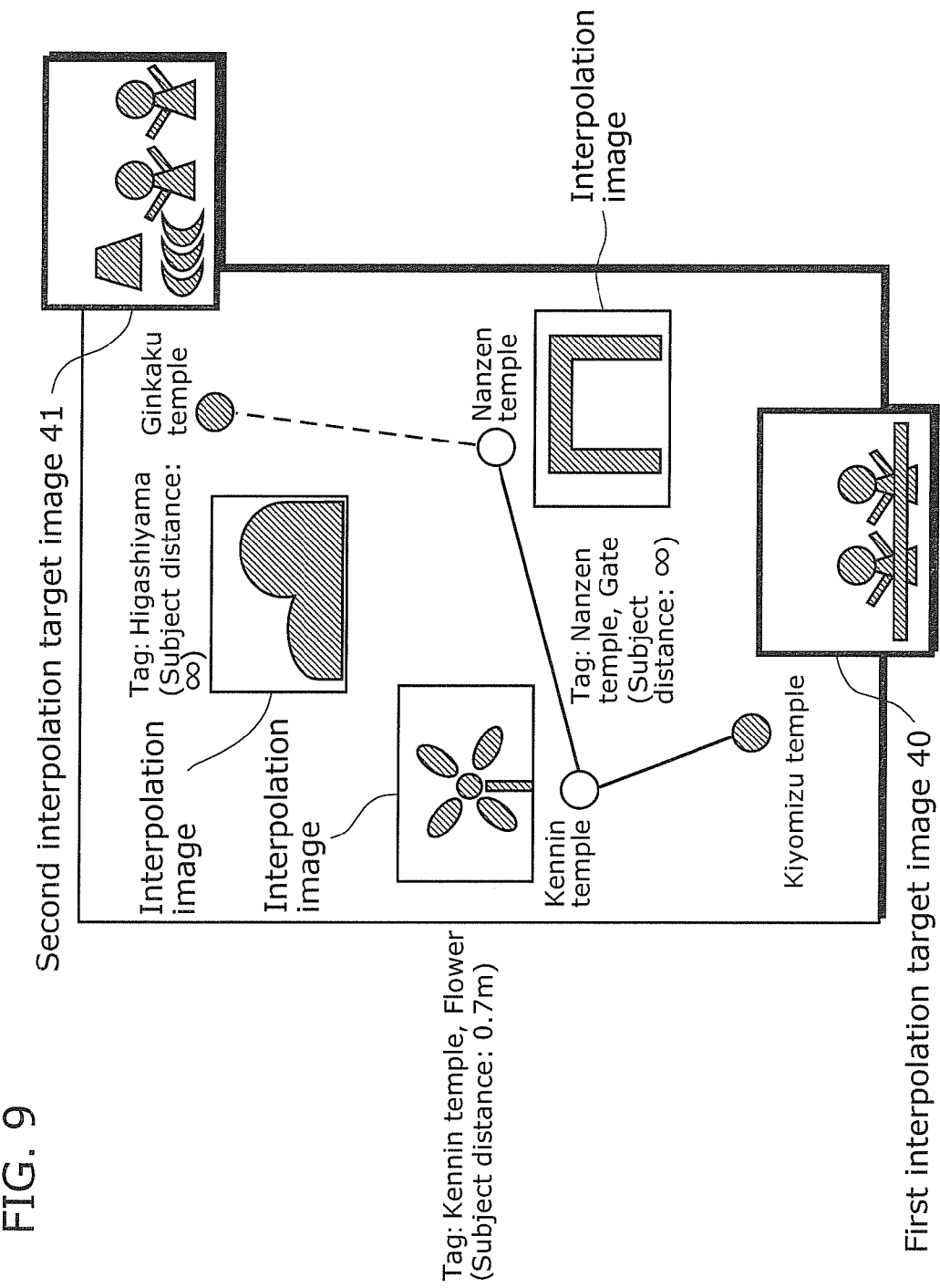
[FIG. 9]
Figure 10:
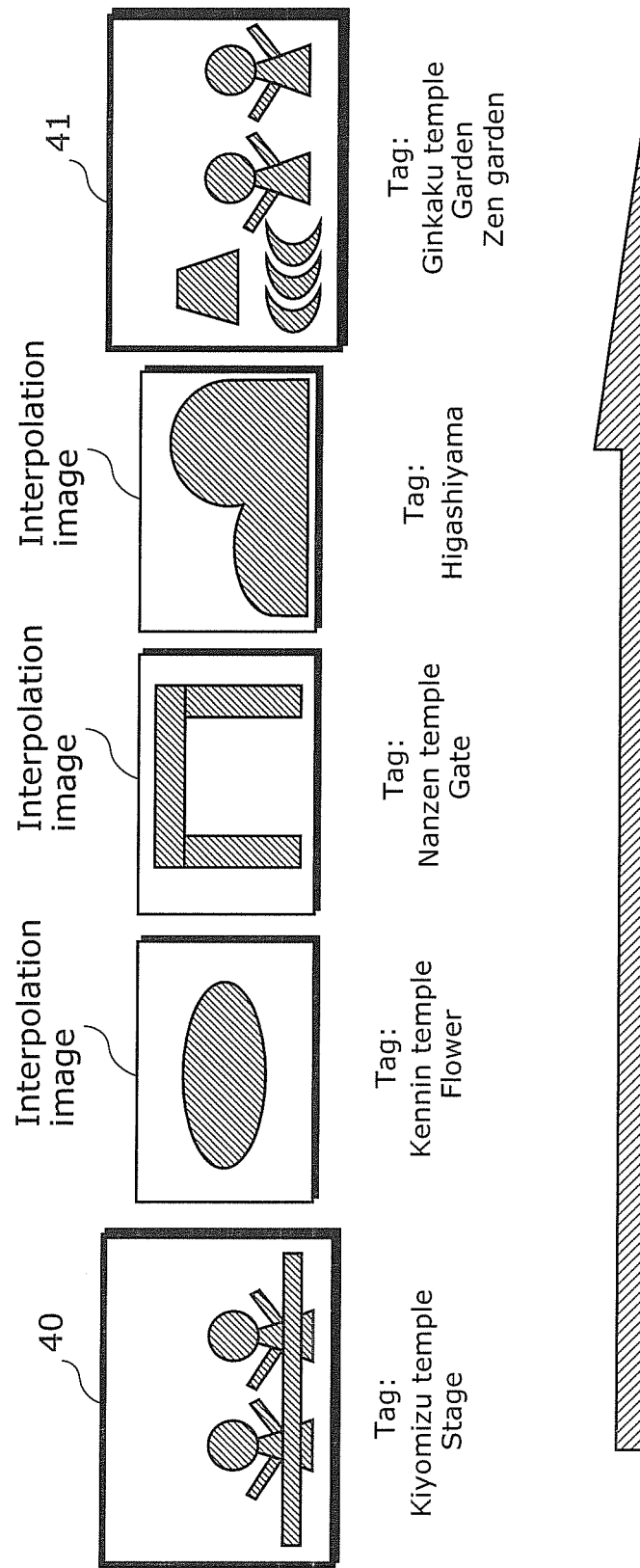
[FIG. 10]

FIG. 9 and FIG. 10 each is a diagram showing an example of a screen provided to the output medium by the output unit 107. As shown in FIG. 9, the output unit 107 may display a list of the interpolation images on a map or the like. Further, as shown in FIG. 10, the output unit 107 may display the interpolation images in the order of closeness to the photographing location in a slide show format.

As described, by performing the processing of Step S101 to Step S106, the image search device 100 can infer the imaging content of the interpolation images; and thus, the image search device 100 can obtain, as the interpolation images from among a large amount of stored images, images of other users who took similar photos.

More specifically, the image search device 100 according to the present embodiment can select the interpolation images from among the images stored in the image database 101. This allows the user to obtain the interpolation images without requiring the user to stop at the photo spots. Further, the image search device 100 can select the images with greater subject distance as the traveling speed between the photographing locations of the images is higher. This allows the user to efficiently search for images that the user wishes to use for interpolation.

[Embodiment 2]

Next, an image search device 200 according to Embodiment 2 of the present invention is described.

A feature of the image search device 200 according to the present embodiment is that the image search device 200 extracts, from among the candidate images, the images which are highly associated with the photographing preference of the user, and presents the extracted images to the user. Here, the photographing preference refers to the user's preference of the subject to be photographed, or preference of the image quality such as color of the image or angle of view.

The image search device 100 according to Embodiment 1 obtains, from the images whose photographing locations are included in the interpolation range, images which match the traveling speed of the user, and selects all of the obtained images as the interpolation images. However, with this method, in the case where the number of the interpolation images to be presented exceed the maximum number of the images that can be presented, the image search device 100 may fail to present the interpolation images which are closer to the user's photographing preference among the interpolation images to be presented. For example, it is assumed that the user takes a lot of photos having the theme of "garden". When there are interpolation images with the subjects "garden" and "building" and the image search device can present only one of them, the image search device cannot always present the image of the "garden" unless the image search device knows the user's preference. If the image search device knows the user's photographing preference based on the images photographed by the user, it is possible to preferentially present the images which have higher degree of association with the user's photographing preference from among the interpolation images to be presented, thereby improving user-friendliness.

The image search device 200 according to the present embodiment extracts the images which are highly associated with the photographing preference of the user, using, for example, the tags, photographing time, or photographing locations of the images photographed by the user. It is to be noted that similarly to Embodiment 1, in the present embodiment, an example case is used where a travel photo album is created by interpolating images stored on a server with respect to the images photographed by the user during the user's trip to Kyoto.

Hereinafter, with reference to FIG. 11, each element of the image search device is described in order.
(Description of each Element of Embodiment 2)

Figure 11:
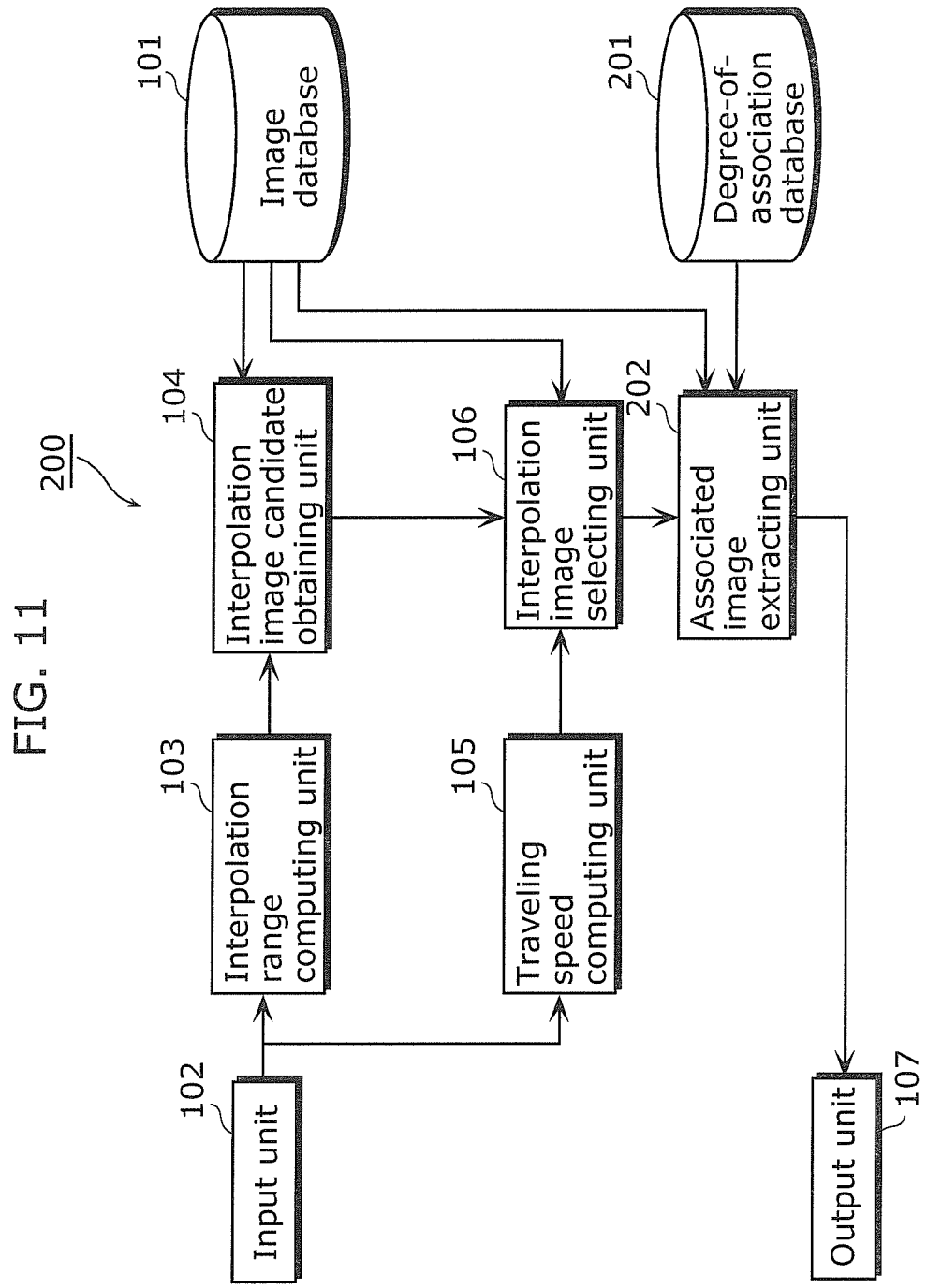
[FIG. 11]

FIG. 11 is a block diagram showing characteristic functional structure of the image search device 200 according to Embodiment 2 of the present invention. In FIG. 11, like referential numbers are used to indicate like elements as in FIG. 1, and their descriptions are not repeated. The image search device 200 shown in FIG. 11 is different from the image search device 100 shown in FIG. 1 in that the image search device 200 includes: a degree-of-association database 201 which stores degree of association between the content associated information of the image content data stored in the image database 101; and an associated image extracting unit 202 which extracts, from among the interpolation images selected by the interpolation image selecting unit 106, images which are highly associated with the user's photographing preference.

The degree-of-association database 201 is a storage device which includes, for example, hard disk or memory. The degree-of-association database 201 stores degree of association between the image content data 20. More specifically, the degree-of-association database 201 stores degree of association between subject information of the image content data 20. Here, the subject information refers to information of words (keywords) representing the subject of the image content data 20 taken by the user. Specific examples of the subject information include the name of the subject, the name of the area where the subject is located, the number of subjects, the color of the subject that are set to the tag 27.

Further, the degree-of-association database 201 stores the degree of association of the subject information on an area basis. To be more specific, the degree-of-association database 201 stores, for each area, the degree of association between the tags 27 of the image content data 20 belonging to each area. Here, the areas refer to places each divided based on prefecture, city, 50 km square or the like Further, the degree of association is computed, for example, using a method disclosed in "A Construction Method of a Metadata Space for an Associative Search Utilizing the Relation of Each Word in Documents" (Non-Patent Literature 1: Hidenori HOMMA et al, 16th Data Engineering Workshop (DEWS2005), 6A-o2, the Institute of Electronics, Information and Communication Engineers, 2005).

FIG. 12 is a diagram showing an example of the degree-of-association database 201 for Higashiyama-ward and Sakyo-ward areas which are both in Kyoto city. The degree-of-association database 201 shown in FIG. 12 stores degrees of association between the tags 27 in the row direction and the tags 27 in the column direction at respective points where the row and the column intersect one another. These degrees of association are computed based on co-occurrence of the tags 27 of the image content data 20 belonging to each area.

Here, the area to which the image content data 20 belongs is determined based on the photographing location 26 of the image content data 20.

The areas in the degree-of-association database 201 may be hierarchically grouped into multiple layers. For example, the degree-of-association database 201 may store degree of association between the tags 27 using three level areas that are small area, middle area, and large area.

Figure 13:
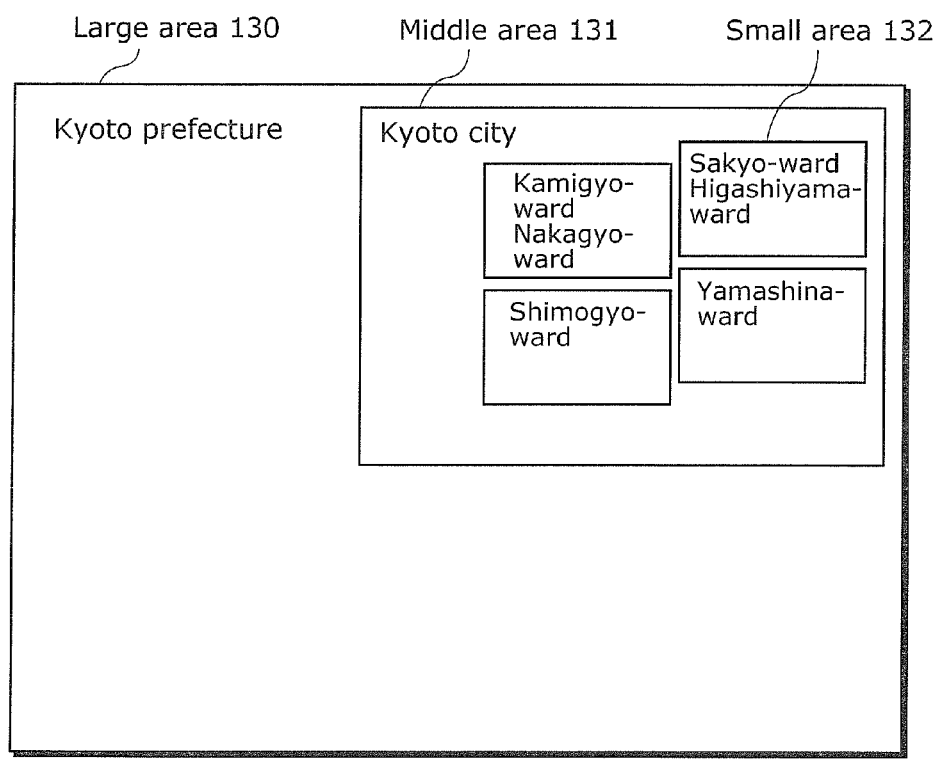
[FIG. 13]

FIG. 13 is a conceptual diagram showing the hierarchically grouped areas. As shown in FIG. 13, the degree-of-association database 201 may store degree of association between the tags 27 of the image content data 20 belonging to Kyoto prefecture as the degree of association corresponding to the large area 130 indicating the area in a prefectural unit. Further, the degree-of-association database 201 may store degree of association between the tags 27 of the image content data 20 belonging to Kyoto city as the degree of association corresponding to the middle area 131 indicating the area in a city unit. Further, the degree-of-association database 201 may store degree of association between the tags 27 of the image content data 20 belonging to Shimogyo-ward as the degree of association corresponding to the small area 132 indicating the area in a ward unit. Accordingly, by storing the degree of association for each hierarchically grouped area in the association degree database 201, the associated image extracting unit 202, which will be described later, can select the area for which the association degree is obtained in the degree-of-association database 201 according to the user's desired interpolation area. As a result, the associated image extracting unit 202 can accurately infer the imaging content of the image that the user wishes to interpolate.

The associated image extracting unit 202 includes, for example, a CPU or memory storing programs. The associated image extracting unit 202 extracts, using the image database 101 and the degree-of-association database 201, images which are highly associated with the images photographed by the user from among the interpolation images obtained from the interpolation image selecting unit 106, and notifies the output unit 107 of the image IDs of the extracted images. Specific method of extracting the associated images will be described later.

The associated image is defined as an image which is highly associated with the image information assigned to the image photographed by the user. Examples of the associated image include an image which has a tag which is highly associated with the tag assigned to the image photographed by the user. The tag assigned to the image is information indicating subject or impression of the subject. The image which matches such information on the subject of the images photographed by the user can be referred to as an image which is highly associated with the user's preference.

Further, examples of the associated image include images which are highly associated with the photographing conditions (image information such as photographing time, color information (white balance or RGB ratio), aperture, subject distance, resolution, F value, or shutter speed) of the image photographed by the user. Similarly to the tags, the photographing conditions reflect the user's preference. Thus, the image which matches the photographing conditions of the images photographed by the user can be referred to as an image which is highly associated with the user's preference.

Figure 14:
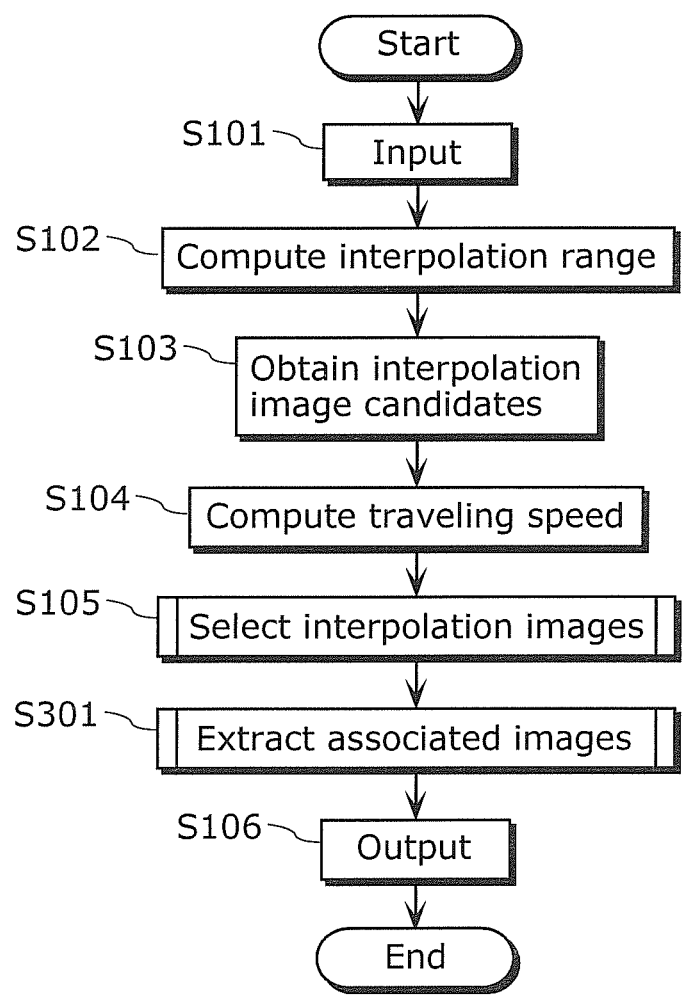
[FIG. 14]

Next, with reference to the flowchart of FIG. 14, the flow of the overall processing performed in the image search device 200 shown in FIG. 11 is described.

FIG. 14 is a flowchart showing flow of overall processing performed by the image search device 200. In FIG. 14, like referential numbers are used to indicate the steps in which the same processing is performed as the processing of the image search device 100 in Embodiment 1 shown in FIG. 6.

The image search device 200 according to the present embodiment is different from the image search device 100 according to Embodiment 1, in the processing where an image which is highly associated with the image photographed by the user is extracted using the degree-of-association database 201 storing the degree of association between the tags of the images stored in the image database 101. However, other processing are the same as those performed by the image search device 100 in Embodiment 1. More specifically, in FIG. 14, the processing of steps S101 to S106 performed by the image search device 200 are the same as those performed by the image search device 100 in Embodiment 1 shown in FIG. 6; and thus, descriptions of them are not repeated.

The associated image extracting unit 202 extracts, using the image database 101 and the degree-of-association database 201, images which are highly associated with the user's preference from among the interpolation images notified from the interpolation image selecting unit 106 (Step S301).

Figure 15:
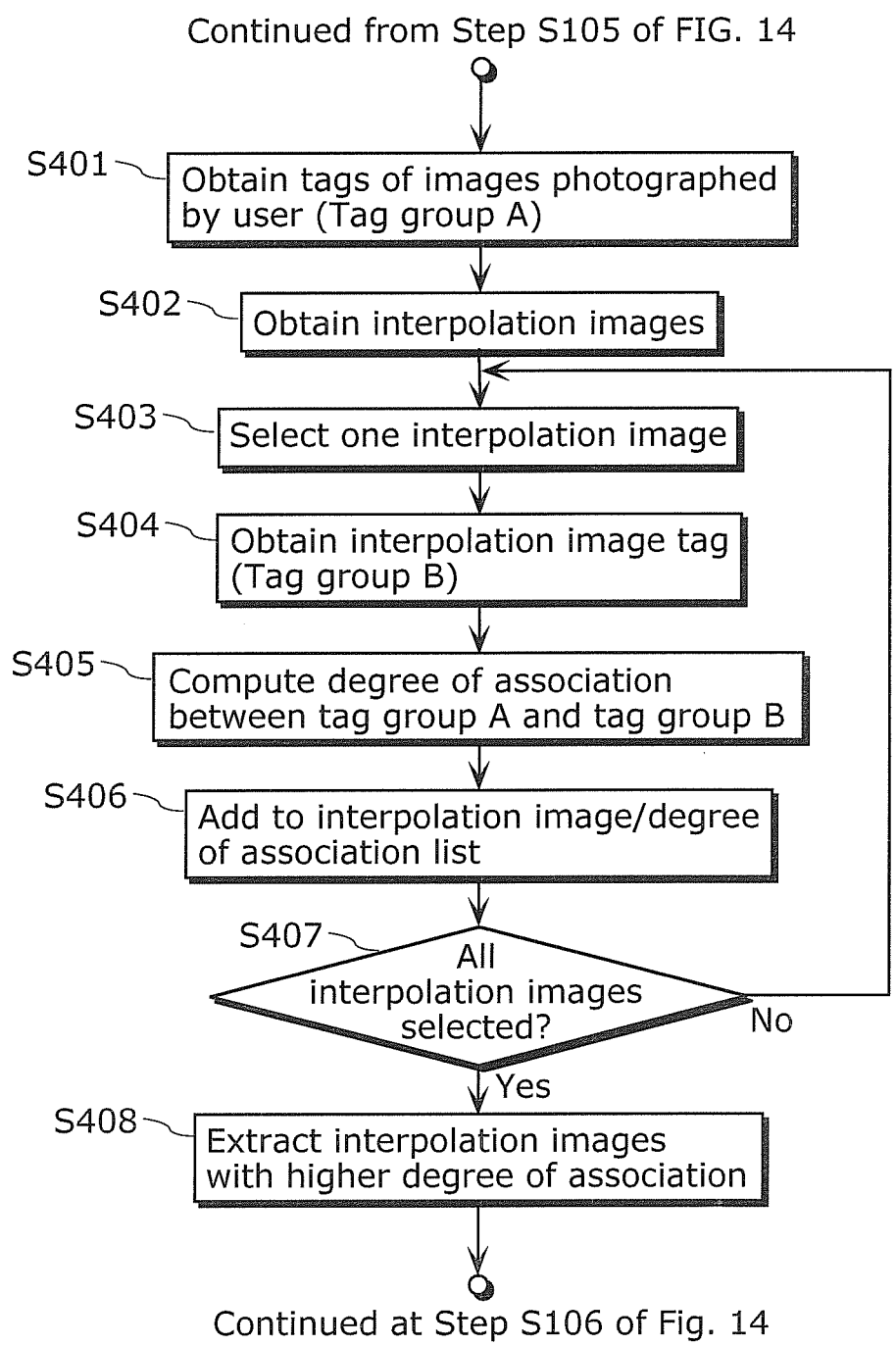
[FIG. 15]

FIG. 15 is a flowchart showing the flow of the detailed processing performed by the associated image extracting unit 202 for extracting the images (Step S301 in FIG. 14). Hereinafter, the method for extracting the images which are highly associated with the user's photographing preference is described with reference to FIG. 15.

First, the associated image extracting unit 202 obtains all the tags assigned to the interpolation target images obtained from the image database 101 in Step S101 (hereinafter, may also be referred to as the images photographed by the user) (Step S401). Hereinafter, the tags obtained in Step S401 are referred to as tag group A.

Next, the associated image extracting unit 202 obtains, from the interpolation image selecting unit 106, the image IDs of the interpolation images (Step S402).

Next, the associated image extracting unit 202 selects one of the image IDs of the interpolation images obtained in Step S402 (Step S403). To be more specific, the associated image extracting unit 202 selects one interpolation image.

Next, the associated image extracting unit 202 obtains, from the image database 101, the tags corresponding to the image ID obtained in Step S403 (Step S404). Hereinafter, the tags obtained in Step S404 are referred to as tag group B.

Next, the associated image extracting unit 202 computes the degree of association between the tag group A obtained in Step S401 and the tag group B obtained in Step S404 (Step S405). Here, the associated image extracting unit 202 refers to the degree-of-association database 201 for the area to which the photographing location 26 of the tag group A belongs, so as to obtain the degree of association of the tag group B with respect to the respective e tags 27 included in the tag group A. Then, the associated image extracting unit 202 computes the degree of association between the tag group A and the tag group B through total addition of the obtained degree of association between the tags. The tag group A includes tags which are assigned to the image photographed by the user, and which reflect the user's preference to the image or concept to the photo. On the other hand, tag group B includes the tags which are assigned by other people to the images photographed by other people and which reflect preference or concept of other people. More specifically, it can be said that the image including the tag group B which is highly associated with the tag group A is the image which is highly associated with the user's preference.

Figure 16:
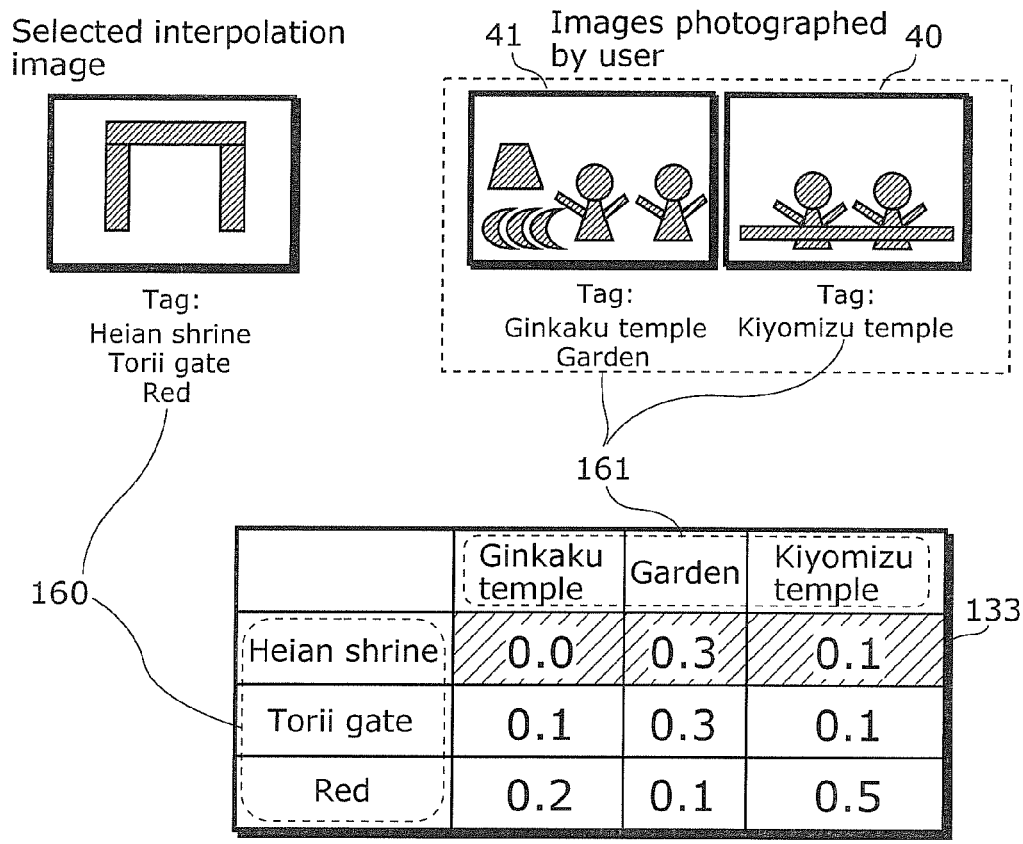
[FIG. 16]

FIG. 16 is a diagram showing an example of the degree-of-association database 201 storing the degree of association between the interpolation image tags 160 ("Heian shrine" "Torii gate" and "Red" (tag group B)) selected in Step S403 and the tags 161 of the images photographed by the user ("Ginkaku temple", "Garden" and "Kiyomizu temple" (tag group A)) obtained in Step S401. Hereinafter, with reference to FIG. 16, an example is described in which the associated image extracting unit 202 computes the degree of association between the interpolation image and the images photographed by the user in Step S405.

In FIG. 16, the degree of association between the "Heian shrine" of the tag group B and the tag group A ("Ginkaku temple", "Garden", and "Kiyomizu temple") can be obtained by adding the degree of association between "Heian shrine" and respective tags of the tag group A (shaded portion 133). In the example shown in FIG. 16, the degree of association between the "Heian shrine" and the tag group A is 0.0+0.3+0.1=0.4. Similarly, the degree of association between the "Torii gate" and the tag group A is 0.5, and the degree of association between "Red" and the tag group A is 0.5. Here, when the obtained respective degrees of association are added, 0.4+0.5+0.5=1.4 is obtained. This value is the degree of association between the image (interpolation image selected in Step S403) and the interpolation target images obtained in Step S101. In such a manner, the association degree between the image photographed by the user and the interpolation images are computed by adding all of the degrees of association which are between the tags assigned to both of the images photographed by the user and the interpolation images and are obtained by the associated image extracting unit 202 referring to the degree-of-association database 201.

Next, the associated image extracting unit 202 stores, to the image ID/degree-of-association list, the degree of association computed in Step S405 as well as the image ID of the interpolation image selected in Step S403 (Step S406).

Next, the associated image extracting unit 202 determines whether or not all the interpolation images obtained in Step S402 has been selected in Step S403 (Step S407).

Here, when all the interpolation images has been selected (Yes in Step S407), the associated image extracting unit 202 extracts the images with higher association degree from an interpolation image/degree-of-association list till reaching the maximum number of images that can be output (Step S408). More specifically, when the interpolation images are arranged in the order from highest degree of association in the interpolation image/degree-of-association list, the associated image extracting unit 202 extracts the interpolation images with degree of association higher than that of the interpolation image that appears, in the list, in the same order as the maximum number of images that can be output. Here, the maximum number of images that can be output refers to the maximum number of images that can be output by the output unit 107. It is determined by the storage capacity, display area, or the like of an output medium.

On the other hand, when one or more interpolation images have not been selected (No in Step S407), the associated image extracting unit 202 repeats processing of Steps S403 to S406.

As described, by performing the processing of Steps S401 to S408, the associated image extracting unit 202 can extract, from among the interpolation images obtained by the interpolation image selecting unit 106, the interpolation images which are highly associated with the user's photographing preference.

As described, by performing the processing of Step S101 to S106, and Step S301, the image search device 200 can preferentially present images which are highly associated with the user's photographing preference, even when the number of interpolation images selected by the interpolation image selecting unit 106 exceeds the maximum number of images that can be presented.

More specifically, the image search device 200 according to the present embodiment can extract the interpolation images which are highly associated with the subject of the interpolation target images, by referring to the degree-of-association database storing the degree of association between subject information. This allows the user to more efficiently search for the images that the user wishes to use for interpolation. Further, the image search device 200 can obtain the degree of association corresponding to the photographing location of the interpolation target image by referring to the degree-of-association database storing the degree of association for each area. This allows the user to more efficiently search for the images that the user wishes to use for interpolation.

In Step S301, the associated image extracting unit 202 may extract, using the image database 101, images which have high association degree (hereinafter, may also be referred to as similarity) with the photographing conditions of the images photographed by the user (images obtained from the input unit 102), from among the interpolation images notified by the interpolation image selecting unit 106. The photographing preference of the user reflects not only the subject, but also the photographing conditions. Here, the photographing conditions refer to photographing parameter automatically assigned to an image when the image is taken, such as color information (white balance, RGB ratio), aperture subject distance, resolution, F value, and shutter speed.

Figure 17:
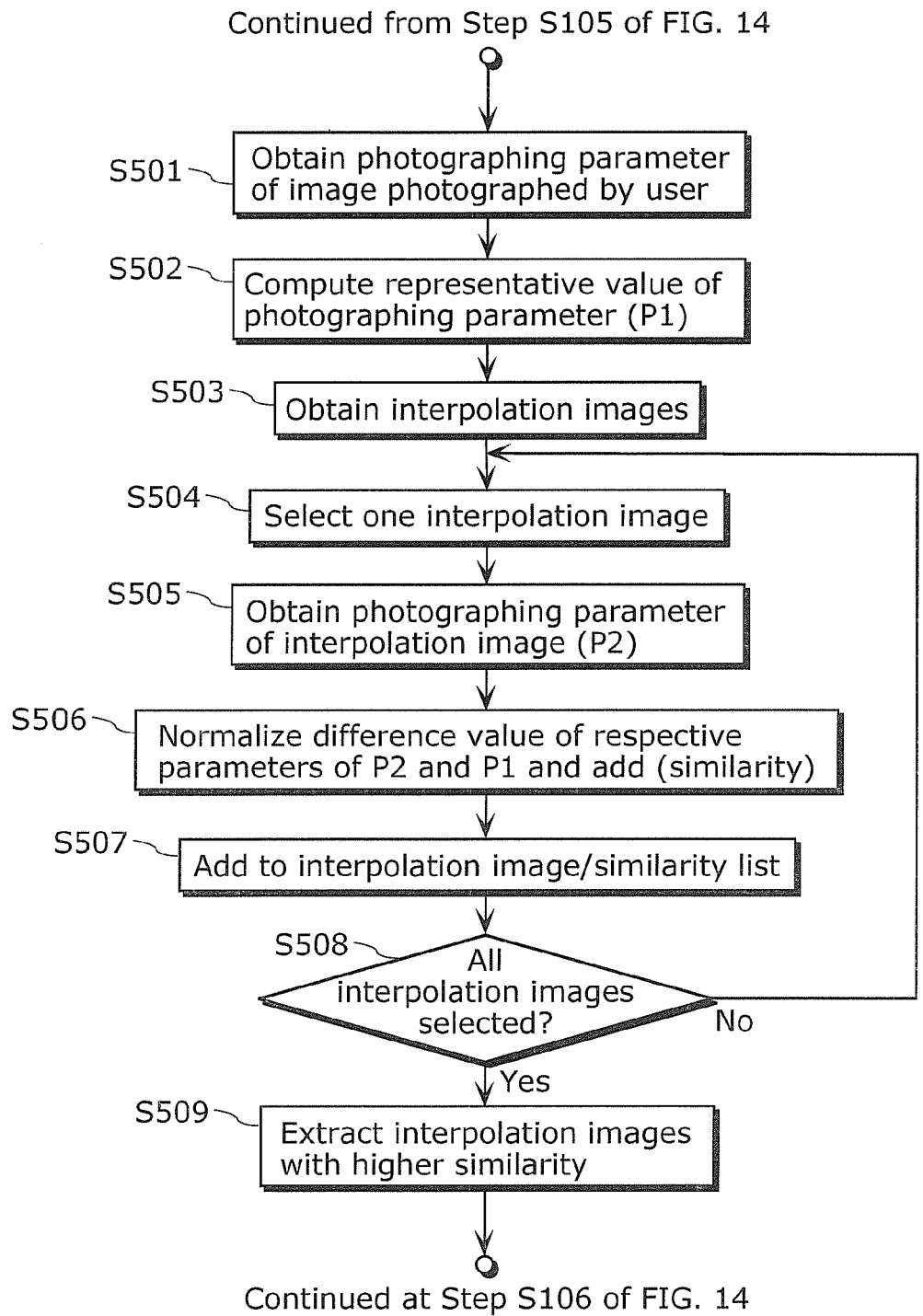
[FIG. 17]

FIG. 17 is a flowchart showing flow of processing performed by the associated image extracting unit 202 for extracting images with higher similarity with the photographing conditions of the images photographed by the user. Hereinafter, the method for extracting the images which are highly associated with user's photographing conditions is described with reference to FIG. 17.

First, the associated image extracting unit 202 refers to the image database 101 so as to obtain the photographing parameters assigned to the images photographed by the user (images obtained in Step S101) (Step S501). The photographing parameter refers to information automatically assigned to each image when the image is taken, such as color information (white balance, RGB ratio), aperture, subject distance, resolution, F value, or shutter speed.

Next, the associated image extracting unit 202 computes the respective representative values (P1) of the photographing parameters obtained in Step S501 (Step S502). The representative value refers to an average value, median value, or mode value of all the images in each parameter.

Next, the associated image extracting unit 202 obtains the interpolation images selected by the interpolation image selecting unit 106 (Step S503).

Next, the associated image extracting unit 202 selects one image from among the interpolation images obtained in Step S503 (Step S504).

Next, the associated image extracting unit 202 refers to the image database 101 so as to obtain the photographing parameters (P2) of the interpolation image obtained in Step S504 (Step S505).

Next, the associated image extracting unit 202 computes the similarity e between the photographing parameter of the images photographed by the user and the selected interpolation image, using the representative values (P1) computed in Step S502 and the photographing parameters (P2) obtained in Step S505 (Step S506). The similarity e can be obtained, for example, by the following equation (2).

[Equation 2]

$$e = \sum_{i=0}^{n} \left| \frac{P2i - P1i}{P1i} \right| \qquad (2)$$

Here, n denotes the number of types of photographing parameters to be compared with, P1*i* denotes the i-th photographing parameter of P1, and P2*i* denotes the i-th photographing parameter of P2. As is clear from the equation (2), the total sum of the values obtained by normalizing, using the parameter value of P1, the difference value of respective parameters of P1 and P2 is computed as the similarity e. Therefore, as the similarity e is closer to the value 0, the photographing parameter between the images photographed by the user and the interpolation image selected in Step S504 are similar to each other. To be more specific, as the value of the similarity e is closer to the value 0, the degree of association of the photographing conditions between the images obtained in Step S101 and the interpolation image selected in Step S504 are higher.

Next, the associated image extracting unit 202 creates lists of combination of the interpolation image selected in Step S504 and the similarity computed in Step S506, and stores the lists (Step S507).

Next, the associated image extracting unit 202 determines whether or not all the interpolation images obtained in Step S503 has been selected in Step S504 (Step S508). The image search device 200 continues the processing at Step S509 when all of the interpolation images has been selected (Yes in Step S508), and continues the processing at Step S504 when one or more interpolation images have not been selected (No in Step S508).

Next, the associated image extracting unit 202 refers to the lists of the interpolation images and similarity stored in Step S507 so as to extract as many images with higher similarity as the number of maximum images that can be output (Step S509).

As described, by performing the processing of Steps S501 to S509, the associated image extracting unit 202 can extract, from among the interpolation images obtained by the interpolation image selecting unit 106, the interpolation images which are highly associated with the user's photographing conditions.

More specifically, the image search device 200 can extract the interpolation images with photographing conditions that are highly associated with those of the interpolation target images. This allows the user to more efficiently search for the images that the user wishes to use for interpolation.

The image search device according to an aspect of the present invention has been described so far based on the embodiments; however, the present invention is not limited to those embodiments. Those skilled in the art will readily appreciate that many modifications in the exemplary embodiments and combinations of elements in different embodiments are possible without materially departing from the novel teachings and advantages of this invention. Accordingly, all such modifications are intended to be included within the scope of this invention.

For example, in the above embodiments, the image search devices 100 and 200 include the image database 101, the input unit 102, the traveling speed computing unit 105, the output unit 107, and the like; however, these units do not always have to be included.

In such a case, it is sufficient that the interpolation range computing unit 103 obtains, from an external device or the like via, for example, network, interpolation target images (including the first image and the second image) and information (including the first information and the second information) concerning each interpolation target image. Further, it is sufficient that the interpolation image candidate obtaining unit 104 and the interpolation image selecting unit 106 refer to the image database included in the server or the like, via, for example, network. Further, it is sufficient that the interpolation image selecting unit 106 obtains the traveling speed between the photographing locations of respective interpolation target images from, for example, the image database or information regarding respective interpolation target images. With this, even when the image search device does not include the traveling speed computing unit 105 or the like, the image search device can relatively easily search a plurality of images for images that the user wishes to use for interpolating photographing locations of the images selected by the user, without requiring the user to stop at the photo spots.

Further, in the image search device according to the above described embodiments, the threshold of the subject distance is determined by comparing the traveling speed with a predetermined threshold; however, the image search device according to an aspect of the present invention is not limited to such image search device. For example, it may be that the image search device according to an aspect of the present invention refers to a subject distance database storing table including relationship between the traveling speed and the subject distance, so as to determine the threshold of the subject distance.

FIG. 18 is a diagram showing an example of a subject distance database. As shown in FIG. 18, the subject distance database stores thresholds of traveling distance with respect to the traveling speed. For example, when the traveling speed is "20 km/h", the image search device selects, as an interpolation image, an image with the subject distance of "10 m" or more. Here, when the exact same traveling speed is not found in the subject distance database, the image search device may use the threshold of the subject distance with respect to the closest traveling speed stored in the subject distance database. Note that it may be that the image search device according to an aspect of the present invention determines the threshold of the subject distance, using the equation indicating the relationship between the traveling speed and the subject distance, instead of using the subject distance database.

Further, in the image search device according to Embodiment 2, the associated image extracting unit extracts images from among the interpolation images selected by the interpolation image selecting unit; however, the image search device according to an aspect of the present invention is not limited to such image search device. For example, in the image search device according to an aspect of the present invention, the associated image extracting unit may extract images from among candidate images. Then, the interpolation image selecting unit may select interpolation images from among the images extracted by the associated image extracting unit.

Further, in the above embodiments, the subject distance is included in the content associated information 21; however, the subject distance may be obtained by the interpolation image selecting unit 106 using the equation (1).

Figure 19:
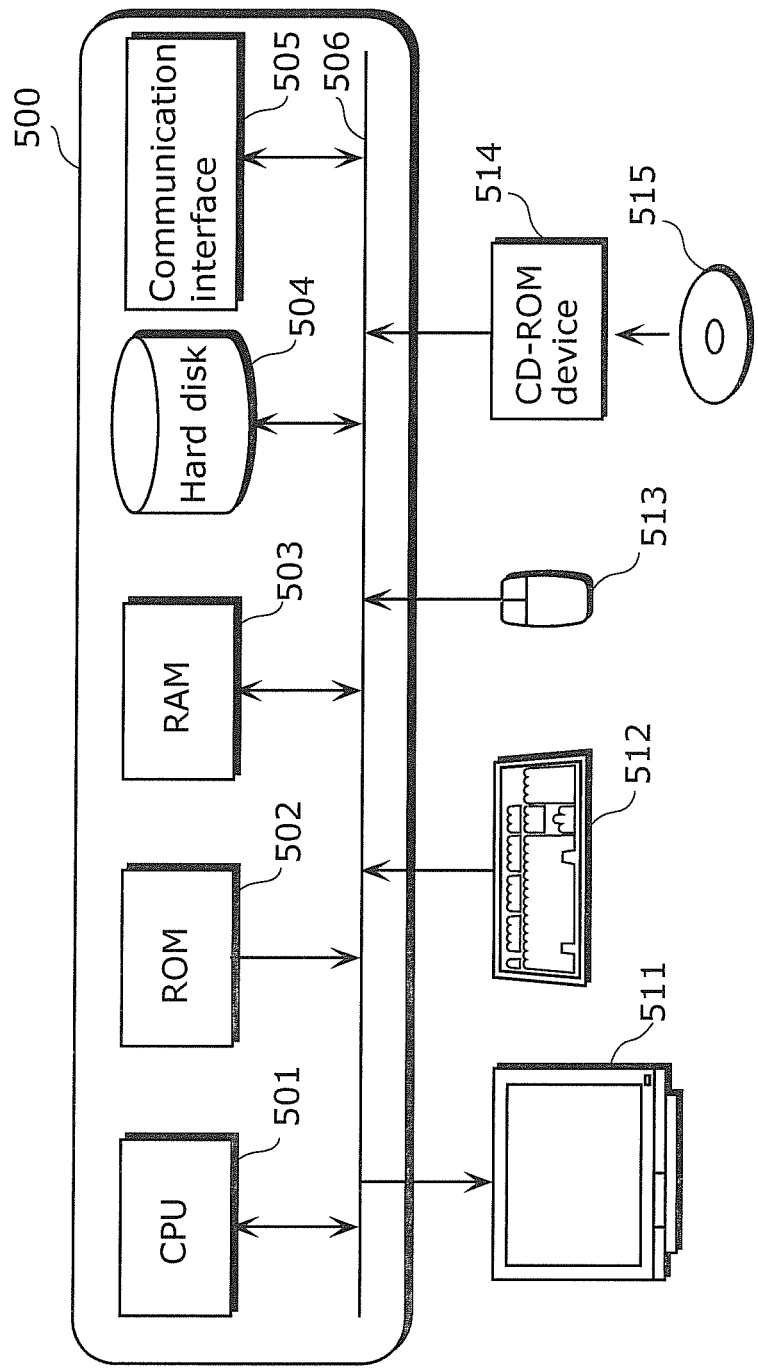
[FIG. 19]

It is to be noted that the present invention can be implemented as an image search method which executes characteristic elements of such an image search device and also as a program causing a computer as shown in FIG. 19 to execute the method. Such program can be distributed via a recoding medium such as a CD-ROM, and a transmission medium such as the Internet.

FIG. 19 is a diagram showing an example of a computer hardware configuration. A program, for searching a plurality of images for interpolation images, is stored in, for example, a CD-ROM 515 that is a computer-readable medium, and read out via a CD-ROM device 514. Further, for example, the program, for searching a plurality of images for interpolation images, is transmitted via, for example, a wired or wireless network, or broadcasting.

A computer 500 includes: a Central Processing Unit (CPU) 501; a Read Only Memory (ROM) 502; a Random Access Memory (RAM) 503; a hard disk 504; a communication interface 505, and the like.

The CPU 501 executes a program read out via the CD-ROM device 514 or received via the communication interface 505. To be more specific, the CPU 501 loads, into the RAM 503, the program read out via the CD-ROM device 514 or received via the communication interface 505. The CPU 501 executes each instruction coded in the program expanded in the RAM 503.

The ROM 502 is a read only memory which stores programs or data necessary for the operations of the computer 500. The RAM 503 is used as a work area when the CPU 501 executes the programs. To be more specific, for example, the RAM 503 temporarily stores data such as parameters for program execution. The hard disk 504 stores programs, data, and the like.

The communication interface 505 communicates with other computers via network. A bus 506 connects the CPU 501, the ROM 502, the RAM 503, the hard disk 504, the communication interface 505, a display 511, a keyboard 512, a mouse 513, and the CD-ROM device 514, to one another.

As described, the image search device according to an aspect of the present invention can be used as an image search device which can relatively easily search a large volume of stored image content data for images that the user wishes to use for interpolation.

For example, the image search device according to an aspect of the present invention can be used as a device which automatically creates a photo album by searching a database including a large volume of image data on the Web or the like for images that the user wishes to use for interpolation.

Further, the conventional methods require relatively large infrastructure cost because tag readers must be installed at every photo spots of tourist sites. For example, in case of the tourist cites having many photo spots, such as Kyoto or Okinawa, tag readers must be installed at respective photo spots, which is costly. Further, costs for maintaining those tag readers are also necessary.

On the other hand, the image search device according to the embodiments of the present invention produces an advantageous effect that such a dedicated infrastructure is not necessary.

INDUSTRIAL APPLICABILITY

The present invention can be used as an image search device which searches a large volume of stored image content data for image content data to be used for interpolation between the photographing locations of the image content data photographed by the user.

REFERENCE SIGNS LIST

20 Image content data
21 Content associated information
22 User ID
23 Image ID
24 Image address
25 Photographing time and date
26 Photographing location
27 Tag
28 Subject distance
40 First interpolation target image (Kiyomizu temple)
41 Second interpolation target image (Ginkaku temple)
50 Range information
51 Range information
52 Interpolation range
80 Candidate image
81 Interpolation image (when traveling at low speed)
82 Interpolation image (when traveling at high speed)
100, 200, Image search device
101 Image database
102 Input unit
103 Interpolation range computing unit
104 Interpolation image candidate obtaining unit
105 Traveling speed computing unit
106 Interpolation image selecting unit
107 Output unit
130 Large area
131 Middle area
132 Small area
133 Shaded portion
160 Interpolation image tag
161 Tag of an image photographed by a user
201 Degree-of-association database
202 Associated image extracting unit

The invention claimed is:

1. An image search device which searches a plurality of images for an interpolation image to be used for interpolation between locations at which at least two interpolation target images were taken by a user imaging device, each of the plurality of images being stored in an image database and being associated with a subject distance between a subject and a subject imaging device when the image is taken by the subject imaging device, said image search device comprising:

an interpolation range computing unit configured to compute an interpolation range of a geographical area including a first photographing location and a second photographing location, the first photographing location being a location of the user imaging device when a first interpolation target image is taken by the user imaging device, and the second photographing location being a location of the user imaging device when a second interpolation target image is taken by the user imaging device;

an interpolation image candidate obtaining unit configured to obtain a candidate image being associated with a subject photographing location within the interpolation range computed by said interpolation range computing unit, the candidate image being obtained from among the plurality of images stored in the image database; and an interpolation image selecting unit configured to select the interpolation image from among a candidate image group including at least the obtained candidate image, the selected interpolation image being associated with the subject distance equal to or greater than a threshold distance when a traveling speed of the user imaging device between the first photographing location and the second photographing location is equal to or greater than a threshold speed.

2. The image search device according to claim 1, further comprising a traveling speed computing unit configured to compute the traveling speed of the user imaging device between the first photographing location and the second photographing location, using a distance between the first photographing location and the second photographing location, and a difference between a time and date at which the first interpolation target image was taken by the user imaging device and a time and date at which the second interpolation target image was taken by the user imaging device,
 wherein said interpolation image selecting unit is configured to select the interpolation image by using the traveling speed computed by said traveling speed computing unit.

3. The image search device according to claim 1, further comprising an associated image extracting unit configured to obtain a first degree of association and a second degree of association, and to extract the interpolation image such that the degrees of association indicated by the obtained first degree of association and the obtained second degree of association are equal to or greater than a predetermined threshold, the first degree of association being a degree of association between the interpolation image selected by said interpolation image selecting unit and the first interpolation target image, the second degree of association being a degree of association between the interpolation image selected by said interpolation image selecting unit and the second interpolation target image,
 wherein each degree of association indicates a degree of association between associated information items, each of which is associated with an image.

4. The image search device according to claim 3, further comprising a degree-of-association database which stores a degree of association between keywords each associated with a subject,
 wherein said associated image extracting unit is configured to refer to said degree-of-association database, so as to (i) obtain, as the first degree of association, the degree of association between a keyword which is associated with a subject and which is obtained from the interpolation image and a keyword which is associated with a subject and which is obtained from the first interpolation target image, and (ii) obtain, as the second degree of association, the degree of association between the keyword which is associated with the subject and which is obtained from the interpolation image and a keyword which is associated with a subject and which is obtained from the second interpolation target image.

5. The image search device according to claim 4,
 wherein said degree-of-association database stores the degree of association for each area of a plurality of areas, and
 said associated image extracting unit is configured to obtain, as the first degree of association, a degree of association corresponding to an area, of the plurality of areas, including the first photographing location of the first interpolation target image, and to obtain, as the second degree of association, a degree of association corresponding to an area, of the plurality of areas, including the second photographing location of the second interpolation target image.

6. The image search device according to claim 3, wherein said associated image extracting unit is configured to obtain, as the first degree of association, a degree of association between a photographing condition with which the interpolation image was taken and a photographing condition with which the first interpolation target image was taken, and to obtain, as the second degree of association, the degree of association between the photographing condition with which the interpolation image was taken and a photographing condition with which the second interpolation target image was taken.

7. The image search device according to claim 1, wherein said interpolation range computing unit is configured to compute the interpolation range such that the interpolation range includes a larger area as a difference increases between a photographing time and date at which the first interpolation target image was taken and a photographing time and date at which the second interpolation target image was taken.

8. The image search device according to claim 1, wherein the selected interpolation image is associated with the subject distance of any value when the traveling speed of the user imaging device between the first photographing location and the second photographing location is less than the threshold speed.

9. An image search method performed by a computer for searching a plurality of images for an interpolation image to be used for interpolation between locations at which at least two interpolation target images were taken by a user imaging device, each of the plurality of images being stored in an image database and being associated with a subject distance between a subject and a subject imaging device when the image is taken by the subject imaging device, said image search method comprising:
 computing an interpolation range of a geographical area including a first photographing location and a second photographing location, the first photographing location being a location of the user imaging device when a first interpolation target image is taken by the user imaging device, and the second photographing location being a location of the user imaging device when a second interpolation target image is taken by the user imaging device;
 obtaining a candidate image being associated with a subject photographing location within the interpolation range computed by said computing, the candidate image being obtained from among the plurality of images stored in the image database; and
 selecting the interpolation image from among a candidate image group including at least the obtained candidate image, the selected interpolation image being associated with the subject distance equal to or greater than a threshold distance when a traveling speed of the user imaging device between the first photographing location and the second photographing location is equal to or greater than a threshold speed.

10. The image search method according to claim 9, further comprising computing the traveling speed of the user imaging device between the first photographing location and the second photographing location, using a distance between the first photographing location and the second photographing location, and a difference between a time and date at which the first interpolation target image was taken by the user imaging device and a time and date at which the second interpolation target image was taken by the user imaging device,
 wherein said selecting selects the interpolation image by using the traveling speed computed by said computing of the traveling speed.

11. The image search method according to claim 9, further comprising:
 obtaining a first degree of association and a second degree of association; and
 extracting the interpolation image, such that the degrees of association indicated by the obtained first degree of association and the obtained second degree of association are equal to or greater than a predetermined threshold, the first degree of association being a degree of association between the interpolation image selected by said selecting and the first interpolation target image, the second degree of association being a degree of association between the interpolation image selected by said selecting and the second interpolation target image, wherein each degree of association indicates a degree of association between associated information items, each of which is associated with an image.

12. The image search method according to claim 11, further comprising:

storing, in a degree-of-association database, a degree of association between keywords each associated with a subject; and referring to the degree-of-association database, so as to (i) obtain, as the first degree of association, the degree of association between a keyword which is associated with a subject and which is obtained from the interpolation image and a keyword which is associated with a subject and which is obtained from the first interpolation target image, and (ii) obtain, as the second degree of association, the degree of association between the keyword which is associated with the subject and which is obtained from the interpolation image and a keyword which is associated with a subject and which is obtained from the second interpolation target image.

13. The image search method according to claim 12, wherein the image search method further includes storing, in the degree-of-association database, the degree of association for each area of a plurality of areas, and wherein said extracting further includes obtaining, as the first degree of association, a degree of association corresponding to an area, of the plurality of areas, including the first photographing location of the first interpolation target image, and obtaining, as the second degree of association, a degree of association corresponding to an area, of the plurality of areas, including the second photographing location of the second interpolation target image.

14. The image search method according to claim 11, wherein said extracting further includes obtaining, as the first degree of association, a degree of association between a photographing condition with which the interpolation image was taken and a photographing condition with which the first interpolation target image was taken, and obtaining, as the second degree of association, the degree of association between the photographing condition with which the interpolation image was taken and a photographing condition with which the second interpolation target image was taken.

15. The image search method according to claim 9, wherein said computing of the interpolation range computes the interpolation range such that the interpolation range includes a larger area as a difference increases between a photographing time and date at which the first interpolation target image was taken and a photographing time and date at which the second interpolation target image was taken.

16. The image search method according to claim 9, wherein the selected interpolation image is associated with the subject distance of any value when the traveling speed of the user imaging device between the first photographing location and the second photographing location is less than the threshold speed.

17. A non-transitory computer-readable recording medium having a computer program recorded thereon, the computer program being for searching a plurality of images for an interpolation image to be used for interpolation between locations at which at least two interpolation target images were taken by a user imaging device, each of the plurality of images being stored in an image database and being associated with a subject distance between a subject and a subject imaging device when the image is taken by the subject imaging device, and the computer program causing a computer to execute a method comprising:

computing an interpolation range a geographical area including a first photographing location and a second photographing location, the first photographing location being a location of the user imaging device when a first interpolation target image is taken by the user imaging device, and the second photographing location being a location of the user imaging device when a second interpolation target image is taken by the user imaging device;

obtaining a candidate image being associated with a subject photographing location within the interpolation range computed by said computing, the candidate image being obtained from among the plurality of images stored in the image database; and selecting the interpolation image from among a candidate image group including at least the obtained candidate image, the selected interpolation image being associated with the subject distance equal to or greater than a threshold distance when a traveling speed of the user imaging device between the first photographing location and the second photographing location is equal to or greater than a threshold speed.

18. The non-transitory computer-readable recording medium according to claim 17, further comprising computing the traveling speed of the user imaging device between the first photographing location and the second photographing location, using a distance between the first photographing location and the second photographing location, and a difference between a time and date at which the first interpolation target image was taken by the user imaging device and a time and date at which the second interpolation target image was taken by the user imaging device, wherein said selecting selects the interpolation image by using the traveling speed computed by said computing of the traveling speed.

19. The non-transitory computer-readable recording medium according to claim 17, further comprising:

obtaining a first degree of association and a second degree of association; and extracting the interpolation image, such that the degrees of association indicated by the obtained first degree of association and the obtained second degree of association are equal to or greater than a predetermined threshold, the first degree of association being a degree of association between the interpolation image selected by said selecting and the first interpolation target image, the second degree of association being a degree of association between the interpolation image selected by said selecting and the second interpolation target image, wherein each degree of association indicates a degree of association between associated information items, each of which is associated with an image.

20. The non-transitory computer-readable recording medium according to claim 17, wherein the selected interpolation image is associated with the subject distance of any value when the traveling speed of the user imaging device between the first photographing location and the second photographing location is less than the threshold speed.

* * * * *